(12) United States Patent
Feaver et al.

(10) Patent No.: US 8,015,101 B2
(45) Date of Patent: Sep. 6, 2011

(54) E-COMMERCE TRANSACTION FACILITATION SYSTEM AND METHOD

(75) Inventors: Donald P. Feaver, Brighton (AU);
Kenneth G. Wilson, Camberwell (AU);
Craig A. Astill, Brighton (AU)

(73) Assignee: IP3 Systems, Ltd., South Melbourne (AU)

( * ) Notice: Subject to any disclaimer, the term of this patent is extended or adjusted under 35 U.S.C. 154(b) by 0 days.

(21) Appl. No.: 12/588,009

(22) Filed: Sep. 30, 2009

(65) Prior Publication Data

US 2010/0023445 A1    Jan. 28, 2010

Related U.S. Application Data

(63) Continuation of application No. 11/747,741, filed on May 11, 2007, now abandoned, which is a continuation-in-part of application No. 11/491,271, filed on Jul. 21, 2006, now abandoned, which is a continuation of application No. 10/244,955, filed on Sep. 16, 2002, now abandoned, which is a continuation of application No. PCT/AU01/00299, filed on Mar. 16, 2001.

(30) Foreign Application Priority Data

Mar. 16, 2000  (AU) .................................. PQ6289

(51) Int. Cl.
*G06Q 40/00* (2006.01)
(52) U.S. Cl. ........................................ 705/37; 705/36 R
(58) Field of Classification Search .................. 705/35, 705/36 R, 37, 26, 27, 39; 463/1, 43; 707/9
See application file for complete search history.

(56) References Cited

U.S. PATENT DOCUMENTS

| | | | |
|---|---|---|---|
| 5,970,475 A | 10/1999 | Barnes et al. | |
| 6,012,046 A | 1/2000 | Lupien et al. | |
| 6,131,087 A | 10/2000 | Luke et al. | |
| 6,587,827 B1 | 7/2003 | Hennig et al. | |
| 6,598,026 B1 | 7/2003 | Ojha et al. | |
| 6,758,754 B1 * | 7/2004 | Lavanchy et al. | 463/42 |
| 6,886,000 B1 | 4/2005 | Aggarwal et al. | |
| 7,216,093 B1 * | 5/2007 | Gupta et al. | 705/26 |
| 7,415,432 B1 * | 8/2008 | Gianakouros et al. | 705/36 R |
| 2003/0069821 A1 * | 4/2003 | Williams | 705/36 |
| 2003/0115129 A1 * | 6/2003 | Feaver et al. | 705/37 |
| 2004/0107158 A1 | 6/2004 | Odom et al. | |

FOREIGN PATENT DOCUMENTS

| | | |
|---|---|---|
| WO | WO 00/03342 | 1/2000 |
| WO | WO 00/54204 | 9/2000 |
| WO | WO 01/69460 | 9/2001 |

OTHER PUBLICATIONS

Kakabadse et al, "Critical review—outsourcing: A paradigm shift" 2000 Journal of Management Development v19n8 pp: 670-728.*
Currie, Antony "The politics of multi-bank sites" Jan. 2001 Euromoney n381 pp: 94-101.*

* cited by examiner

*Primary Examiner* — Kelly Campen
(74) *Attorney, Agent, or Firm* — Oliff & Berridge, PLC

(57) ABSTRACT

A method of operating a computer to facilitate a commercial transaction involving a plurality of negotiable trading parameters where the facilitation of activities that occur within a real economic trading system is accomplished by providing a mechanism by which the structure, dynamics and business process requirements of real economic processes and emulated and thereby contributing to efficiently functioning markets and optimal transactional outcomes.

12 Claims, 16 Drawing Sheets

FIGURE 1 System Overview

Outbound Signals- Micro to Macro

Inbound Signals- Macro to Micro

Sell to Procure Outbound Signals: Micro to Micro

Search Mechanism

Stock Item Procurement

Non-Stock Item Procurement

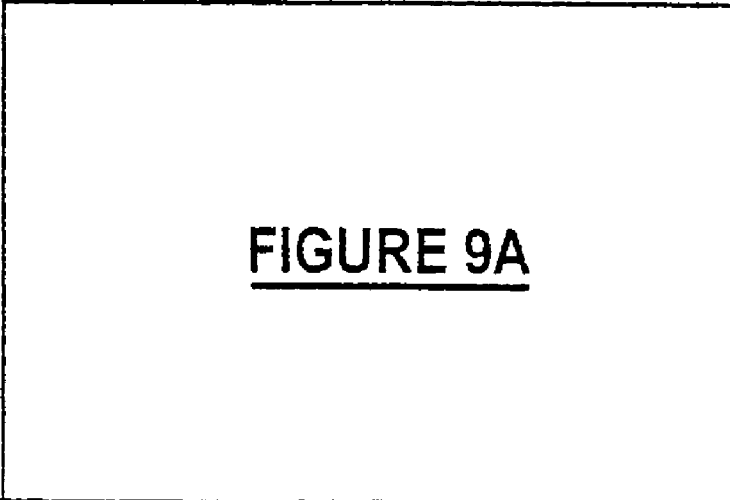
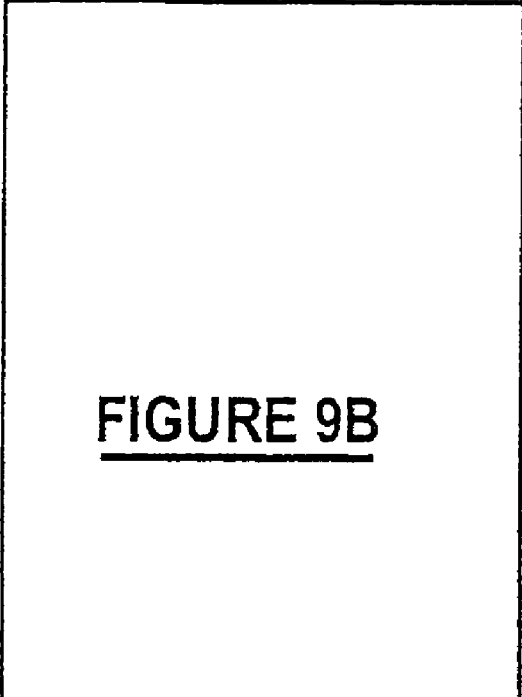 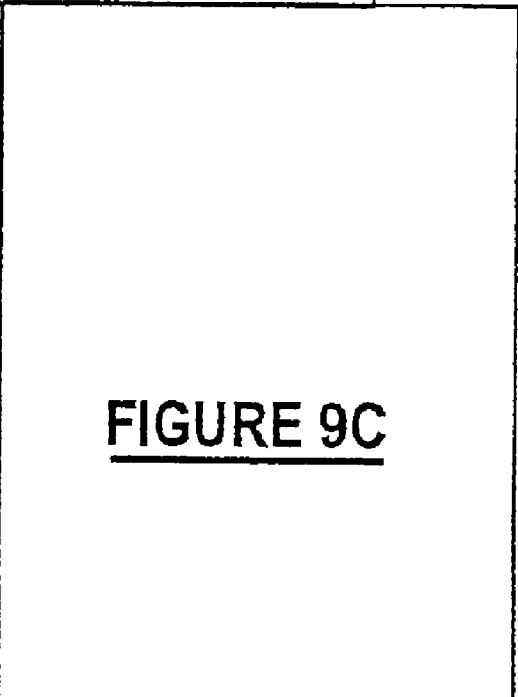
FIGURE 9

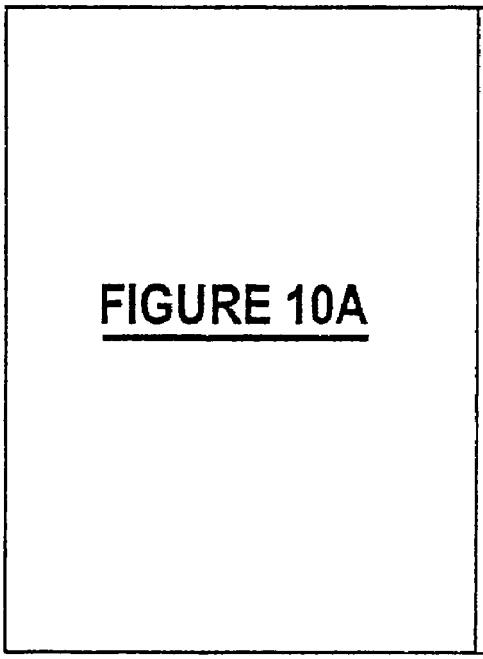 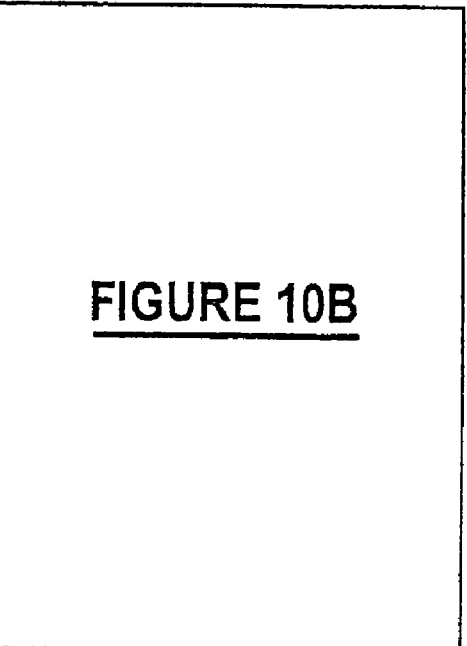
FIGURE 10

E-COMMERCE TRANSACTION FACILITATION SYSTEM AND METHOD

CROSS-REFERENCE TO RELATED APPLICATIONS

This application is a continuation of U.S. patent application Ser. No. 11/747,741, filed May 11, 2007, which is a continuation-in-part of U.S. patent application Ser. No. 11/491,271, filed Jul. 21, 2006, which is a continuation of U.S. patent application Ser. No. 10/244,955, filed Sep. 16, 2002, which is a continuation of International Patent Application No. PCT/AU01/00299, filed Mar. 16, 2001, which claims priority from Australian Provisional Patent Application No. PQ6289, filed Mar. 16, 2000. The entire contents of each of the above related applications are incorporated herein by reference.

The invention relates to the facilitation of commercial transactions, and relates particularly to the facilitation of commercial transactions using electronic communications networks, otherwise known as e-commerce transactions. The invention relates to the facilitation of activities that occur within a real economic trading system by providing a mechanism by which the structure, dynamics and business process requirements of 'real' economic processes and emulated and thereby contributing to efficiently functioning markets and optimal transactional outcomes.

Globalization of the world economy and the increasing ubiquity of Internet usage have resulted in product markets becoming increasingly more competitive and immediate than ever before. Despite the immense interest in facilitation of business-to-business (B2B) transactions using e-commerce, a cost-effective and easily implemented B2B solution that provides comprehensive e-enablement for market search, e-procurement and e-sales functions that integrate with/to enterprises' back-office software systems is not generally in use.

A model for economic interaction in the form of a computer-based system does not exist that provides a comprehensive solution that enables business enterprises to use the communications infrastructure of the Internet to transact online within an economic environment/framework that possesses the structural characteristics of 'real' economic processes that are essential to producing optimal transactional outcomes. Moreover, existing tools are particularly inadequate to address the complexity associated with international transactions where the trade amounts are often significant.

To date, Internet-based business systems that cater to facilitating commercial transactions between business enterprises (B2B) have been developed using economic frameworks that are seriously flawed. Numerous different models or configurations of so-called "digital marketplaces" have emerged in recent years. These existing models would appear to be based on an imprecise understanding and/or use of the technology that results in a distortion of fundamental economic principles.

For example, the existing e-commerce models emphasize the notion of creating digital marketplaces. Two predominant models are the "business portal" that provides a centralized multi-product "retail or end-user" style model; or the "industry-specific marketplace" model. Although both purport to create digital marketplaces, these models represent an electronic environment in which business contacts may be established that may lead to the eventual transaction of business. However, neither of these models is capable of capturing the subtle complexity of the dynamics underlying well-functioning markets.

Until now, B2B e-commerce business systems have neglected to deal with the subtle, distinctions that exist between the concepts of markets, industries, firms and products. The failure to properly configure the processes that flow from the inter-relationship between these concepts has had the effect of creating artificial business environments rather than extending existing product markets.

Instead, efficient and well-functioning digital markets must be configured within an economic framework that enhances and extends, rather than distorts, the competitive dynamics and structural relationships of existing patterns of economic activity and behaviour.

The economic dimensions of commercial processes are complex and operate at many different levels. In a conventional context, the economic inter-relationships that combine to produce well functioning markets and resource-efficient business transactions arise from signals and feedbacks between buyers and sellers that are channelled through multiple forms of information networks. The Internet has challenged the conventional forms of information signals and feedbacks as the information network is capable of consolidation within a single medium.

A consequence of the unification of information delivery within a single dynamic medium is the mistaken belief that a change in information network structure has the potential to change the principles underlying fundamental economic behaviour and relationships. This belief, however, is not accurate. In order for an economically-based business system to function consistent with first best principles of efficiency, systems must be designed to be consistent with, and enhance, economic structures and processes in order to deliver efficient market and transactional outcomes.

In order to construct an efficient commercial delivery process within the parameters of electronic business networks, the Applicant has determined that it would be desirable for there first to be an identification and understanding of the structural inter-relationships between prevailing economic concepts/conditions that must be present within an economic system in order to generate efficiently functioning markets and optimal transactional outcomes. Second, it would be desirable for the business process related transactional flows within and between information channels within the system to be clarified.

Table 1 is a table of factors to help explain the conditions that the Applicant has determined to be desirable to embed within the structure of an efficiently functioning economic system. An optimized electronic B2B model should be capable of emulating the most critical of the subtle economic interactions that spontaneously occur under conventional circumstances. This has not yet been built into current electronic B2B models because no one has adequately articulated the composition of a unifying economic framework that could provide the system infrastructure for an electronic economic system.

The foundation of the electronic economic system developed by the Applicant is based upon an inter-related set of three parametric conditions. Each parametric condition provides an ingredient required in order for the 'economic process' to function properly. The three system parameters are the:

equilibrium condition/force
optimization condition/force
maximization condition/force In an e-commerce applications context, each of the three parameters corresponds to an important systemic function that transpires within the framework. In order to simplify the arguments that will follow, Table 1 identifies the key relationships that will be discussed further below:

TABLE 1

| Parametric Condition | Dimensional Characteristics | Functional Attributes | Application Purposes |
| --- | --- | --- | --- |
| Equilibrium | Structural mechanics | The macroeconomic (market) to microeconomic (firm) inter-relationship | Firm to market, firm to firm connectivity and data communication channels |
| Optimization | Competitive dynamics | Convergence of demand and supply forces/tensions | User (strategic) behaviour- signals and feedbacks |
| Maximization | Process efficiency | Internal resource utilization and allocation decision-making | Task handling and management |

In broad terms, an 'economic system' is the sum of a series of inter-connected sub-system relationships. The sub-systems are the generators of dynamic forces that each sub-system both injects into, and extracts from, the system in order to execute a 'core business process'. Each sub-system, in turn, is comprised of a consolidation of task-oriented business processes that influence (feed into) the characteristics of the sub-system level process.

The inter-relationship among the three above-referenced system parametric forces to be captured within an e-commerce model can be succinctly contextualized as follows. At the system level the predominant force is the well-functioning system's tendency towards equilibrium (i.e., the balancing of opposing dynamic (supply and demand) forces. At the sub-system level, the predominant function is to reach optimal demand-side or supply-side oriented transactional outcomes (the exchange function). The optimization process, in general terms, is a function of the enterprise's business process driven tendency towards maximizing resource (demand-side expenditure or supply-side revenue gains) relative to the market (equilibrium) benchmark.

In a business process/transactional context, Table 2 is a table of factors that have a subtle, business process inter-relationship. The Applicant has developed a particular configuration of the direct and indirect economic relationships between these structural factors, that is implemented in a manner that, within the context of the medium, efficiently channels information flows to optimize the business process outcomes that correspond to those relationships.

TABLE 2

| Market Focus and Functions | Transaction Focus and Functions |
| --- | --- |
| Buyer | Seller |
| Demand | Supply |
| Industry | Firms |
| Product market | Products |

From a business process perspective, the commercial process can be viewed as having two discrete stages. First is a "market-oriented" dimension. Second, this orientation subsequently shifts at a critical point in the commercial process to a specific "transactional focus". A feature that distinguishes the two is the subset of factors which represent the dominant forces that influence the discrete outcomes occurring at the evolving stages of a commercial process.

The origin of a transaction begins with a buyer. Buyers, in economics, equate with a "demand" or the desire to satisfy a material need. In order to satisfy this need, the buyer conducts a vertical "drilling-down" or information gathering process that begins at a general level and moves to increasing degrees of specificity in identifying:

the product it wants more precisely (for: example, a boat or a automobile; that is, what general industry);

where, or the source, from which the product can be obtained (for example, which firm supplies the product);

comparative product characteristics; i.e., price, quality availability etc.

At this stage, the information gathering process is driven by, and conforms most closely with neo-classical demand theory. Within the context of competitive dynamics, the process explains how buyer-led demand-side forces are the predominant influence affecting the progress of the search from a general to specific refinement process.

At the broadest level, a buyer will conduct a search within more general parameters—at the industry level. An industry, however, is most easily defined as a categorization, typology, or grouping of firms that consists of those firms that operate processes of a sufficiently similar kind and could produce products that are close substitutes. Some firms within an industry will produce certain products, while other firms belonging to the same industry may produce an entirely different range of products. Although there will be a "market" for all products produced by the industry, clearly, there is no such thing as a single "industry market".

The forum, or institutional environment in which the buyer exercises its demand-side influence takes the form of what is described as a "product market". However, a precise definition of what constitutes a "product market" is among one of the more elusive concepts in economics. In fact, there exists no single concept of exactly what is a market. One definition (the Lancastrian definition) asserts that markets should be thought of as being made up of "products having similar characteristics". A combination of these above definitions results in a concept that markets are a notional forum in which products having similar characteristics are exchanged.

At a particular point in the buyer's decision-making process, a fundamental event in the spatial orientation of the demand-side processes occur. At the moment the buyer decides upon the specific type of product it is seeking, the decision-making process ceases to be vertical, and shifts to a horizontally oriented comparative analysis between like goods.

The predominant demand-side function influencing this stage of the transaction is the comparative analysis conducted between products having the same or similar characteristics. If the Lancastrian definition of what constitutes a "product market" is used, it is at this point the buyer truly enters the "product market".

As a consequence of the comparative analysis among goods which are close substitutes, the buyer will eventually select a particular product that most closely conforms to its demand requirements relative to the price it is prepared to pay for that good. In this way, the "selection-decision" is made.

The relational configuration of a buyer seeking information and product specificity is a one (buyer) to many (sellers) (1:M) relationship. Therefore, buyer-led market activity takes the form of a buyer using the medium to identify sellers, compare the characteristics of the products they offer relative to the price indicated (signalled). Properly designed Internet demand-oriented mechanisms have the potential to increase the speed and efficiency with which the buyer conducts search, identification and comparison activities. Business system applications that emulate efficient "market activities" should be directed towards enhancing the search, identification and comparison functions.

A search mechanism that links one buyer to many sellers through a centralized "portal" configuration is appropriate provided that the scope of the search is sufficiently comprehensive to identify and locate a wide enough number of suppliers and, ultimately, products to give the buyer a good approximation of the comparative characteristics of the products offered.

However, existing e-commerce models utilize economic frameworks that create distorted and dysfunctional markets as a result of two errors of structural logic.

First, centralized "portal" style models include within the market only those products that sellers choose to offer for sale within the system. This configuration resembles more an agency, distribution or retail sale arrangement rather than an extension of existing markets. Goods are placed in an artificial environment in a retail sale style arrangement rather than reflecting cross-comparative attributes characteristic of true markets.

Another structurally unsound attribute of the existing models is that the centralized market place which purports to facilitate sales creates a shift from vertical to horizontal spatial functions at the wrong structural dimension. The mechanical implications of this occurrence is that it becomes impossible to optimally integrate subsequent functions which occur in the business process and which are discussed below.

The selection decision described above ceases the vertical movement of market-oriented activities from general to specific. It also ceases the 1:M buyer to supplier relationship. The importance of this change is that another fundamental shift occurs by implication. Rather than having a "market" focus, the business process takes on a "transactional" focus.

The focal point for this analysis alters in that previously it was a buyer:market relationship. Now by implication of the organizational structures of production, the focal point is the buyer:selling firm relationship.

In order to make a sale, the buyer must meet the seller's terms and enter the transaction process. A question now arises as to how to optimally configure the most efficient transaction process by building on, or extending from, the vertical market functions described above.

Transactional outcomes can be well-explained using classical and modern theories of the firm and neo-classical price theory. In addition, a horizontal supply-side transactional orientation is also consistent with concepts of supply-chain efficiency and efficient internal management structures.

An organizational concept that is central to both theoretical principles is the concept of control of key supply-side functions.

One view is that firms or business enterprises exist because they are institutional structures that constitute an optimal mechanism for organizing production, on the one hand, and exchange on the other. Both functions involve the generation of "transaction costs". In this regard, the firm can be seen as a form of interface between the production and exchange functions that exists because it is the structure best capable of most efficiently internalizing transaction costs.

An optimal organizational structure minimizes the transaction costs of production and exchange. In this lies a very strong argument that business transactions can be most efficiently conducted where the control and conduct of the transaction rests with the seller.

The mechanics of this assertion relate back to the close relationship between signals and feedbacks. Firms formulate signals in response to feedbacks. However, signals can only be seen by the market to be adjusted at an external level where the firm has made some internal adjustment as a consequence of feedbacks.

The product pricing decision is among one of the most fundamental decisions a firm makes. Price is a key market signal that can be quickly adjusted in the short-run, and can be used to indicate many messages ranging from product quality to the efficiency of the firm itself.

A notable difference exists between the signal, or asking price, of a product: The ultimate selling price of a product is dictated by a number of closely related factors that are determined by circumstantial conditions. For example, the negotiation of a contractual price will be subject to, among other things:

volume discounts,
payment risks
payment time
country risk
transport arrangements In brief, price negotiations are conducted in a manner that balances the relative influence of the price-related factors in determining a final sale price.

Present e-commerce systems do not emulate real markets. Most can be classified as either being buyer (price-maker auction sites) or seller driven (fixed price-taker sites) that generate artificial or distorted market outcomes. In order to provide efficient and relevant e-commerce tool, transaction hubs cannot be restricted to a fixed-time, lot by lot sales process. Similarly, fixed priced sales mechanisms do not allow for rapid and dynamic adjustment of price relative to short-run seller strategies or price influencing factors such as those described above.

In summary, the Internet is a communications network that possesses media and computational attributes that allow for the unification of information distribution and processing functions that conventionally occur using numerous information distribution and processing channels.

The market-related functions of the business process are demand-side led and involve a one to many relationship where the buyer's demands are met through an information gathering and analysis process that involves a vertical drilling down from a general to specific level.

The Internet is capable of handling such functions through a centralized information gathering, categorizing and sorting mechanism. To ensure the accuracy of information, it is desirable to take the information sought directly from the seller.

Where the buyer identifies a specific product type it wants, it stops gathering information in a vertically flow and a spatial shift to a horizontal product-level comparison takes place.

The selection decision is the critical point at which the buyer, by implication, enters a, 1:1 relationship with a firm. Buyer-led, demand-side market related activities cease and supply-side forces begin to drive the business process. The process takes on a transactional orientation rather than market orientation.

The institutional focal point for supply-side activities is the firm. The firm is an interface between markets and production that exists because it is the institutional structure that is most efficiently able to internalize transaction costs associated with market-related and production-related activities.

In order to manage the inter-relationship between market-side and production-side functions, firms must control the signal/feedback process. Feedbacks are used to make internal adjustments. This, in turn, allows long-run adjustment of signals. In the short-run, the seller must control the pricing and negotiation processes in order to maximize flexibility in the pricing decision arising from strategic competitive decisions or the negotiated adjustment to factors affecting a final price outcome.

Finally, horizontal control of the transaction process allows for supply chain fluidity and consistency. A horizontal distribution of transactional information flows allows for efficient integration of transaction outcomes across the supply-chain.

The Applicant has determined that the implications for e-commerce of these considerations are that 'market-related' functions are best suited to take place within centralized search and consolidation configurations. By contrast, real product markets exist as extensions to firms in that they are institutional structures that produce and place goods in product markets. The nature of the supply-side transactional aspects of the business process are made most efficient, and conform most closely to economic theory, where the key supply-side functions are controlled in a decentralized format by firms themselves.

In order to provide the infrastructure for efficient market and transactional functions to take place, tools such as dynamic negotiating devices and fluid and comprehensive supply-chain integration processes are required from e-commerce business software. To date, no such tools are known to exist.

Accordingly, there currently exists a need to address one or more of the various shortcomings of the existing systems and methods available for facilitating e-commerce transactions.

The Applicant has recognized that commercial transactions can be advantageously facilitated within a systemic framework that is designed to emulate economic processes thereby providing a method by which business process activities can occur within a system structure that coordinates, communicates and facilitates timely and appropriate exchange of specific information to appropriate recipients, at various stages of the transaction process, results in efficiently functioning markets that promote optimal transactional outcomes, that is configured to accommodate international, intra-firm and domestic transactions which transactions are managed from pre-transaction through to post-transaction execution stages conforming to the transaction parameters.

In particular, the Applicant has developed an economic system that enables an exchange/transaction process to occur within a framework that emulates real economic processes. The invention provides the basis for a system structure that is capable of achieving dynamic equilibrium. The equilibrium state is derived from a structural configuration that facilitates a balance through the interaction and alignment of 'near' equivalent dynamic supply (emanating from supply module) and demand forces (emanating the procurement module). The matching of supply and demand forces is further facilitated by business process activities that support the execution and management of exchange transactions by providing mechanisms that expedite the matching process.

The structure of the system enables the matching of a firm's procurement requirements with suppliers of product items having information about those products located within markets, or supplied directly by other firms within the system or by firms that are not part of the system but are given access to the system for the purposes of placing products within it.

Preferably, the mechanism by which the matching of the first firm's procurement requirements with the product's offered for sale by a second firm is performed by a computer-based device that remains within the control of the respective firms. The respective matching mechanisms represent the procurement and sales modular components of a single device performing separate, but complimentary, buy and/or sell related functions. The procurement and sales components may interact with a third search/directory component that performs 'market-related' functions.

In particular, the Applicant has recognized that commercial transactions are advantageously facilitated by obtaining information from one or more of the multiple parties involved in a commercial transaction to determine one or more possible sets of trading parameters that may be acceptable to the parties. Moreover, the Internet is a vast communications network which a large numbers of business enterprises can use to conduct business transactions. In this respect, the Internet is a powerful tool of communication that consolidates within a single medium, the ability of an organization to transmit "outward" messages or signals to attract potential partner organizations to a business transaction while simultaneously permitting organizations to receive and act upon "inward" responses, or feedbacks, from external organizations.

It is emphasized that the Internet is a tool that can directly enhance firms' "exchange" related functions (i.e., interaction with markets and buyers) but indirectly enhances "internal production and supply" functions. In a direct sense, the Internet is capable of enhancing the "price and product" signals it sends to the market (in general) and buyers (in particular). The feedbacks from these signals can be used and interpreted to alter or adjust:

further external signals in the form of price relative to quality to assist in increasing and optimizing market efficiency consistent with neo-classical price theory operations of the firm to further improve process efficiency to further reduce unnecessary transaction costs.

It is important that a firm is in an organizational position to receive and be sensitive to feedbacks. Here, there is a long-run and short-run adjustment dimension that must be considered. Over the longer run, firms use feedbacks to make internal decisions and organizational adjustments that can then be efficiently signalled back to the market. In the short-run, firms can internalize feedbacks that may alter most powerful market signal—the pricing decision. It is at this point price theory plays an appropriate role in understanding business process.

In order to emulate efficient, well-functioning markets, the pricing and negotiation decisions are preferably placed within the control of the seller. Since the price decision is a short-run decision, it is one that cannot be easily transferred to a third part to control on behalf of most sellers. Accordingly, any automated price-related tool is desirably within the seller's direct control for rapid adjustment response purposes, and is both dynamic and multi-parametric.

From a supply-side perspective, and at the product market level of transactional specificity, the supply-chain moves horizontally from a firm's externally oriented market activities into its internal organizational and production oriented structures and functions.

In order to optimize efficiency in the form of maximizing price and quality signals to the market while simultaneously seeking to minimize transaction costs, it is preferable that a firm should control key functions of pricing signals (in the product catalogue), negotiation (transaction hub) and transaction management (post-transaction consolidation) and supply-chain responses (back-end internal integration into ERP systems).

Accordingly, in a first aspect, the invention provides a method of facilitating a commercial transaction, the method including:

providing a set of trading parameters;

accepting in respect of a first entity a desired trading profile including desired values or ranges of multiple of said trading parameters; and accepting in respect of said first entity one or more further trading profiles including values or ranges of multiple of said trading parameters;

establishing one or more functional relationships between variations in a key trading parameter and one or more other of said trading parameters;

wherein each of said further trading profiles are equivalent in desirability or expected value to said desired trading profile, and said functional relationship can be used to determine a set of equivalent trading profiles having substantially desirability equal expected values equivalent to said desired trading profile and said further trading profiles.

Preferably, said first entity is a seller and said trading profile relates to the trading parameters desired by a seller.

Preferably, a submitted trading profile accepted from a second entity can be compared against said equivalent trading profiles of said first entity to determine whether the submitted trading profile is more or less favourable to the first entity that said desired trading profile.

Preferably, trading profiles are generated by or on behalf of said first and second entities with an intention to conduct a commercial transaction, are generated at least with a view to determining market demand or supply for a product or service to which said trading parameters of said trading profiles relate. Preferably, the first and second entities are respectively a seller and buyer, though in other embodiments these roles may be reversed.

Preferably, said trading parameters include one or more of: price, volume, payment terms, credit terms, credit rates of interest. Preferably, said key trading parameter is price.

Preferably, when said submitted trading profile is more favourable than said desired trading profile, a transaction between said first and second entities is initiated. Preferably, the terms of said transaction are based on a transaction trading profile which has trading parameter values which are derived from said submitted trading profile, and/or one or said equivalent trading profiles.

Preferably, said one of said equivalent trading profiles is said desired trading profile, or an equivalent trading profile which is "closest" on a minimum squared distance measure or equivalent measure from said submitted trading profile. In other embodiments, said transaction trading profile is "between" said desired trading profile and said submitted trading profile, in the sense that the transaction trading profile may represent a compromise between terms of the desired trading profile, and terms of the submitted trading profile.

Preferably, when said submitted trading profile is less favourable to said first entity than said desired trading profile, steps are preferably performed with a view to establishing a submitted trading profile and a desired profile that are compatible (i.e. said submitted trading profile being more favourable than said desired trading profile). This may involve a modification of the values or ranges of ~aid trading parameters of said submitted trading profile and/or said desired trading profile. In such cases, it is preferably suggested to either or both of said first, and second entities what changes could be made to their respective trading entities to establish compatible trading profiles.

In a further aspect, the invention provides a method of facilitating a commercial transaction, the method including:

providing a set of trading parameters;

accepting in respect of a first entity a desired trading profile including desired values or ranges of one or more of said trading parameters; and generating a metric representative of the desired trading profile;

wherein said metric can be used as the basis for comparing said desired trading profile with a proposed trading profile.

Preferably, the method further includes generating a metric representing the expected value of the desired trading profile. Preferably, the method further includes accepting from said at least one party multiple desired trading profiles having equal or substantially equal expected values.

Preferably, in each of the equal or substantially equal desired trading profiles, at least the trading parameter of price is different in each profile. Preferably, in each of the equal or substantially equal desired trading profiles, changes in price are indexed against each of the other trading parameters besides price.

Preferably, in each of the equal or substantially equal desired trading profiles, the sensitivity of the trading parameter of price is quantified against each of the other trading parameters. Preferably, this relationship is quantified by an approximate mathematical expression. This relationship may be linear or nonlinear in one or more of the trading parameters. Preferably, the sensitivity of price against each of the other trading parameters is independently quantified.

Preferably, parties to the transaction at least include a buyer and a seller. In some embodiments, the parties to the transaction include a seller and multiple prospective buyers. In this case, the method may further include auction-based techniques.

Advantageously, calculations are performed to determine one or more sets of trading terms which agree with the desired values/ranges of the at least two parties.

Preferably, the prospective buyer and the prospective seller are respectively identified by a search based on a product and/or service classification code.

In another aspect, the invention provides a method of identifying prospective partners in a commercial transaction, the method including:

providing a product and/or service classification code;

providing a database of records relating to respective business entities, said records including information, indexed according to said classification code, recording at least one product or service provided by or required by said entity and at least one desired trading profile in relation to said at least one product or service;

performing, in response to supplied search information including at least one classification code, and at least one submitted trading profile, a search of said database for entities having a desired trading profile at least compatible with said submitted trading profile.

Preferably, said classification code is organized in a hierarchical manner, so that search information of variable specificity or granularity can be provided. Preferably, said classification code is, or is based on or derived from an internationally recognized product and/or service classification code. Preferably, the classification code is, for example, the Harmonized Tariff Code, or HTC.

Preferably, the search information optionally includes supplementary information specific to business organizations, such as geographic region, desired trading terms, credit profile etc.

Preferably, the results of the search can be ranked by one or more predetermined criteria.

Preferably, a number of search fields can be optionally specified in the search information to increase the specificity of the results of the search.

Preferably, the search is performed by a particular user, and search information preferences specific to that particular user are taken into account when conducting the search.

In particular, the search and negotiation stages of the transaction may provide a configuration of trading parameters that set the terms of an executable sales contract. The configuration choices made by system users can result in a series of permutations and combinations of business process tasks that must be completed before the transaction will qualify as being executed. The business process tasks must be executed conforming to the transaction outcome requirements.

Preferably, the contract execution process involves the satisfaction of any one or more of transport and logistic functions, banking or financial functions, insurance and inspection functions, and the adjustment of production, planning and inventory functions within the selling firm.

In a further aspect the present invention provides an e-commerce transaction facilitation system including:

at least a first enterprise resource planning system operatively connected to a first sales module; and at least a second enterprise resource planning system operatively connected to a first procurement model;

wherein one or both of the modules are each implemented by a processing unit and an associated memory unit maintaining computer program cover for causing a method as disclosed to be carried out.

The coordination of the execution of these functions may be conducted in a manner whereby each step in the execution process contract execution process must be satisfied in a stepwise manner in order to minimize use of resources and risk associated with contractual non-performance or failure on the part of either party to the contract.

Embodiments of various aspects of the invention are advantageously implemented in computer software enabled devices and systems. Further, it is highly desirable that embodiments of various aspects of the invention are implemented with the assistance of a communications network, such as the Internet.

In order to assist in arriving at an understanding of the invention, a preferred embodiment is illustrated in the attached drawings. However, it should be understood that the following description is illustrative only and should not be taken in any way as restricting the generality of the invention.

IN THE DRAWINGS

Figure 1:
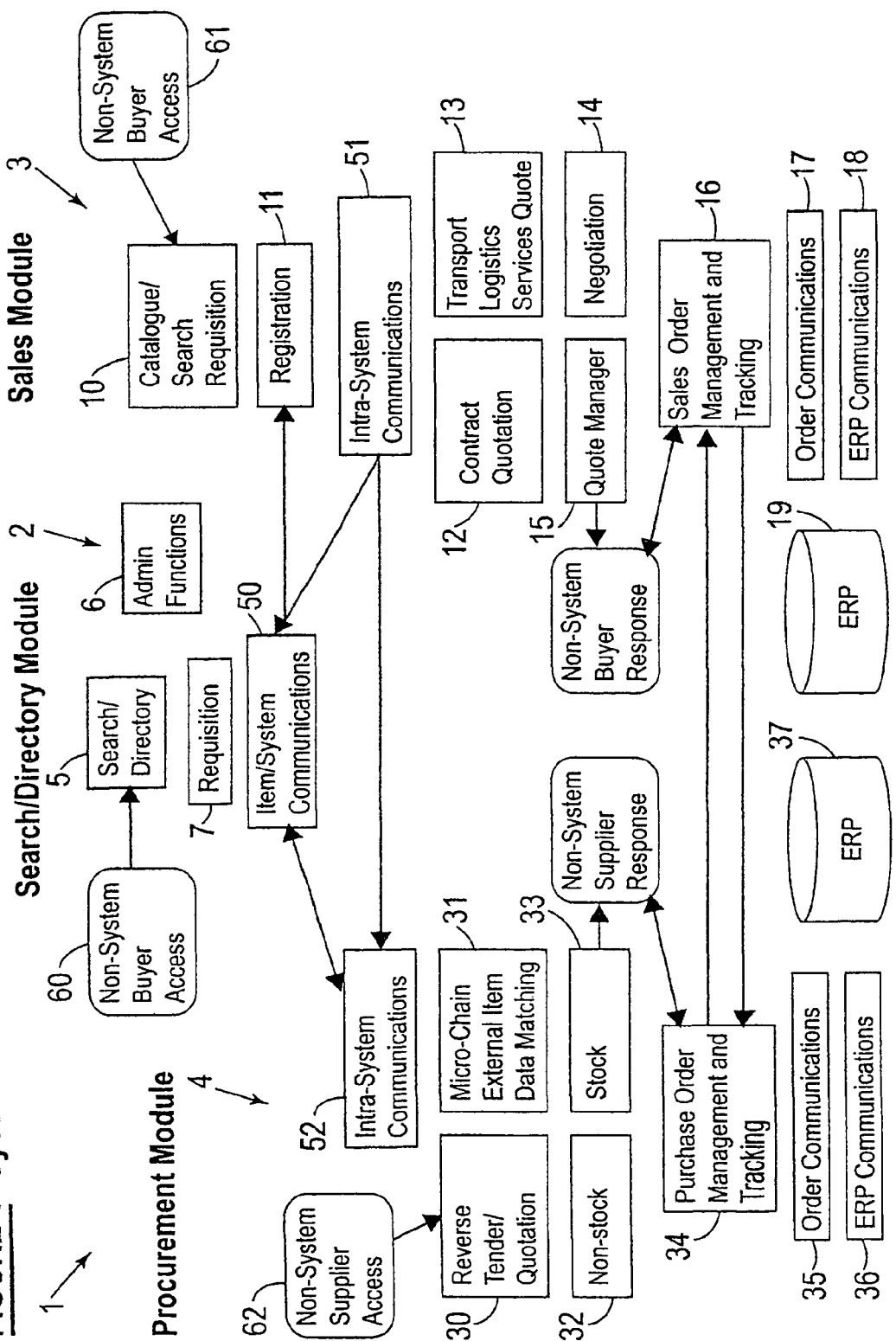
FIG. 1 is a schematic diagram representing a macro view of the system architecture showing the main modules of the system as well as access to the system.

Referring now to FIG. 1, there is shown generally an embodiment of a system 1 for facilitating e-commerce transactions. The system has three complementary components 2 to 4 that operate independently but co-operatively to streamline of the establishment, negotiation and execution of commercial transactions. FIGS. 1-5 are schematic drawings representing an overview of these three complimentary components, the contents of which will be clearer in view of the description explanation of the respective components below.

The described embodiment is particularly well suited to improving the efficiency with which complex international, intra-firm and domestic commercial transactions can be conducted. The three complementary components mentioned above and each in turn described in greater detail below, and are for the sake of convenience referred to as:

Macro/market search/directory
Micro/Sales module
Micro/Procurement module

The first component, a macro/market search/directory module 2, provides a mechanism by which signals originating from separate enterprises are aggregated. The second component, a sales module 3 (supply-side communications module) is a mechanism by which each enterprise controls signals sent to both the macro/market module 2 and/or other enterprises' procurement module. The third component, the procurement module 4 is the mechanism by which the sales module signals can be captured from either the macro/market search/directory 2 or separate micro/sales modules 3.

The three components provide the structure in which business process activities can occur that includes:

product search/selection
negotiation
post-negotiation

The first business process activity, product search/selection, involves an identification of prospective partners to a commercial transaction. The negotiation step facilitates the negotiation or bargaining between multiple parties as to the terms of a proposed commercial transaction. The post-negotiation function assists in the execution of the transaction management and logistical functions that are necessary to be performed to execute any contract which is established between parties as a result of a successful outcome of the negotiation function.

The inter-relationship between the configuration of the three components and the business process activities that occur within the system is important. The structural mechanics of the components provide the foundation of the model, and is designed in a manner to achieve a system-wide equilibrium by providing a balancing of dynamic forces (the second dimension condition), while simultaneously seeking to maximize the efficiency of the user and data inter-relationships in relation to 'user to system' and 'user to user' contexts (the third, business process dimension condition).

In practical terms, the equilibrium condition (at the most basic level) is satisfied by means of constructing the structure having the following mechanical characteristics:

open and decentralized entry and exit for all system actors
decentralized distribution of key sub-system data processing and management functions instantaneous information and process data distribution mechanisms dynamic exchange/adjustment mechanisms In the first respect, FIG. 1 illustrates how, in broad terms, the system satisfies the open access requirement. The search/directory module 2 includes a search/directory component 5 together with an administration component 6 and a requisitions component 7. The functionality of at least part of the search/directory module 2 is provided by an Application Service Provider (ASP) connectable to the sales module 3 and procurement module 4 by a communications network, such as the Internet.

The sales module 3 includes a catalogue/search requisition component 10, a registration component 11, a contract quotation component 12, a transport logistics services quote component 13, a negotiation component 14, a quote manager component 15, and sales order management and tracking component 16. An order communications component 17 and ERP communications component IS enable communication between the sales module 3 and an enterprise resource planning (ER?) system 19 or like electronic data source.

Similarly, the procurement module 4 includes a reverse tender/quotation component 30, a micro-chain external item data matching component 31, a non-stock component 32, a stock component 33 and a purchase order management and tracking component 34. An order communications component 35 and ERP communications component 36 act to interconnect the procurement module 4 and a further ERP system 37.

The sales module 3 and procurement module 4 are realized by conventional computing apparatus and communication devices each including a processing unit and associated memory storage unit maintaining computer program code for causing the computing apparatus to execute the required functionality.

In this example, each of the sales module 3 and the procurement module 4, and associated ERP systems, are located on the premises of separate selling and buying entities. In other embodiments, one or more of the entities may include both a sales module 3 and a procurement module 4 depending upon the commercial activities of that entity.

All modules 2 to 4 of the system 1 interact with each other at a system component to system component level; i.e., buy to sell, sell to buy, sell to market, market to sell, buy to market, market to buy. In that regard, each of the modules 2 to 4 includes a communications gateway, respectively referenced 50 to 52, to facilitate communication between the modules 2 to 4. In addition, where a buyer or a seller does not possess software to permit module to module communication, buyers and seller can access each of the modules 2 to 4 via a standard Internet browser by use of browser access clients, respectively referenced 60 to 62. A browser access client can perform market/search, buy and sell functions by communicating directly with a particular component; it, a market/search, buy or sell component.

Figure 2:
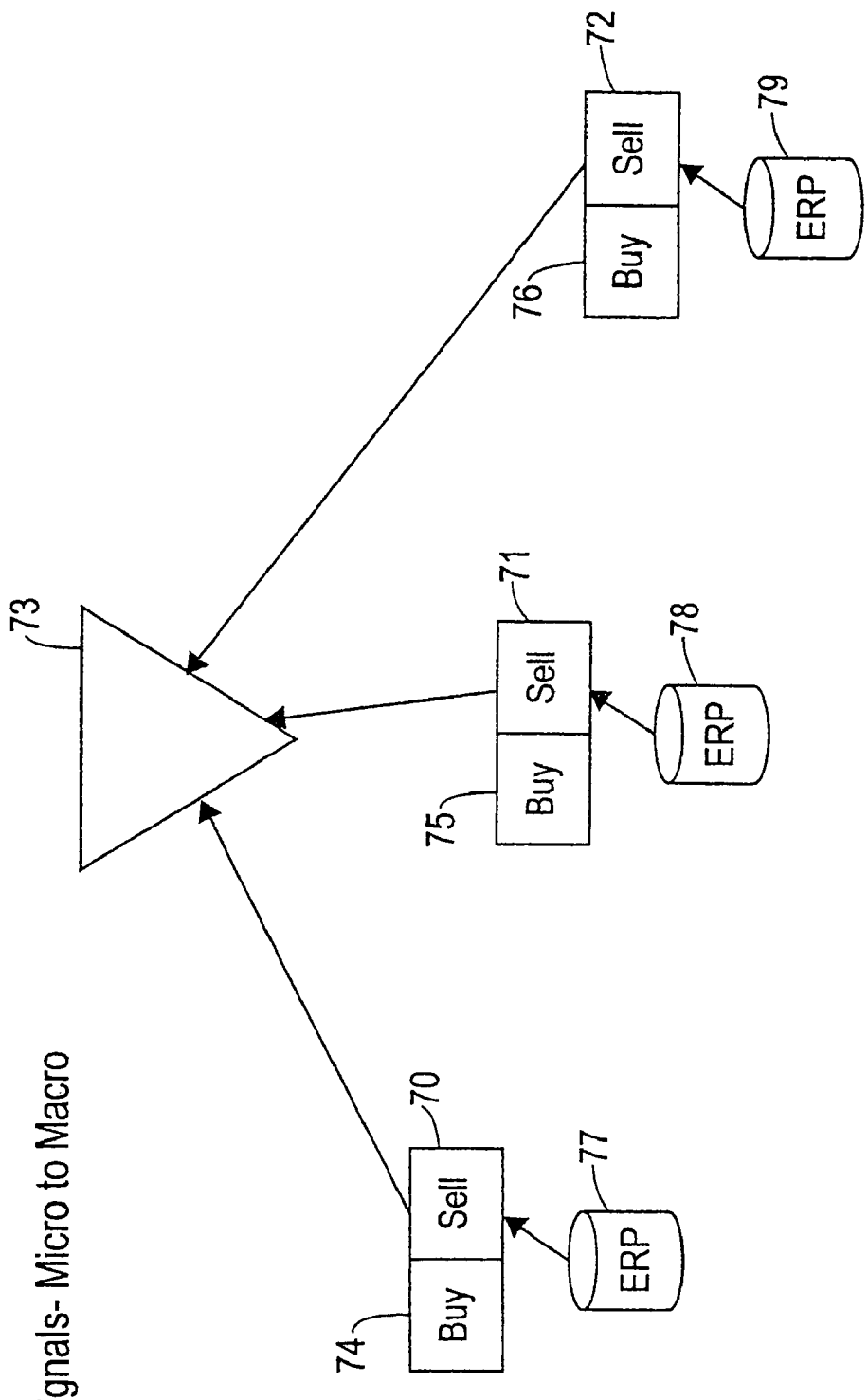
FIG. 2 is a schematic diagram representing the communication flow from the sales module of the system to the search/directory module.
Figure 3:
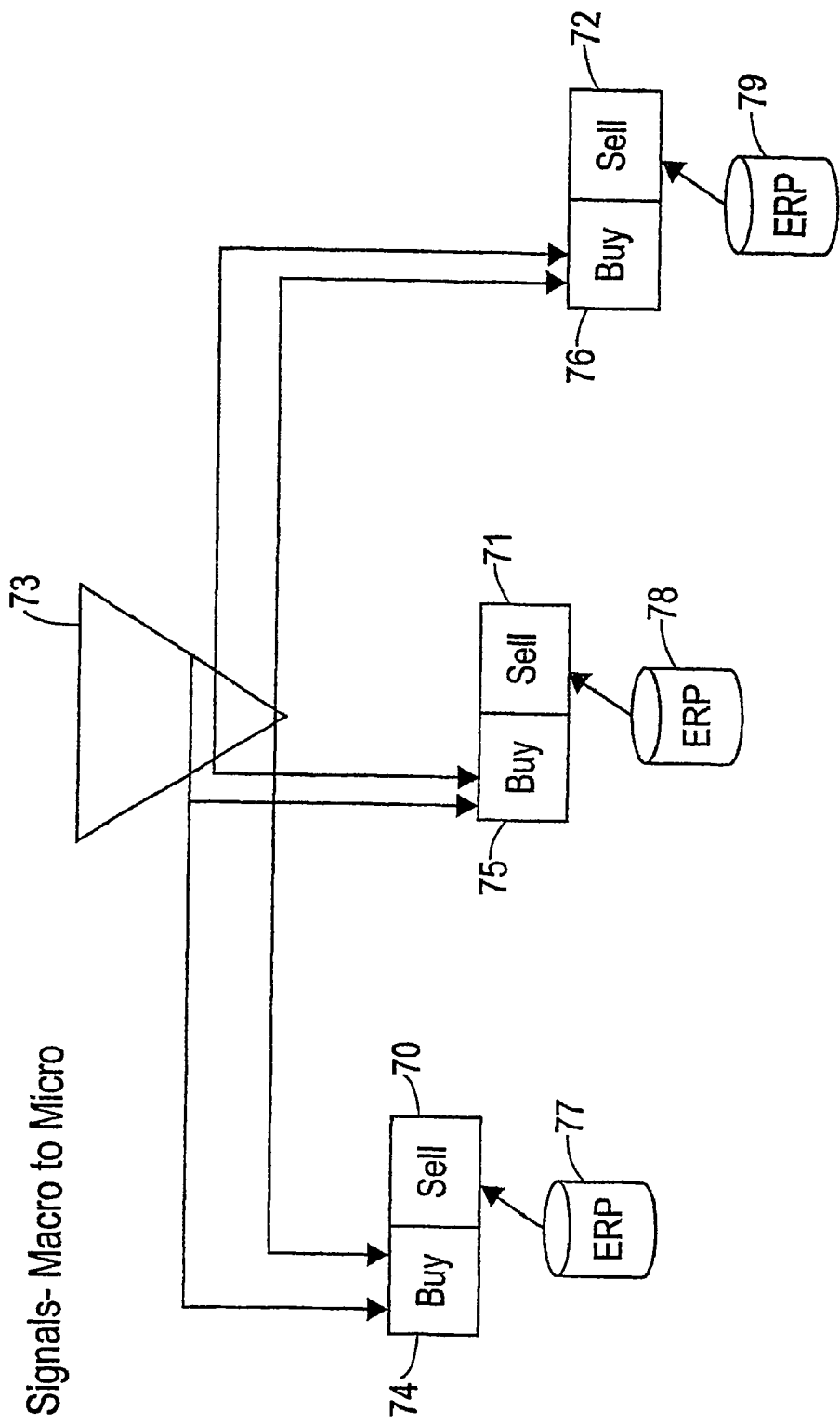
FIG. 3 is a schematic diagram representing the communication flow from the search directory module to the procurement module.
Figure 4:
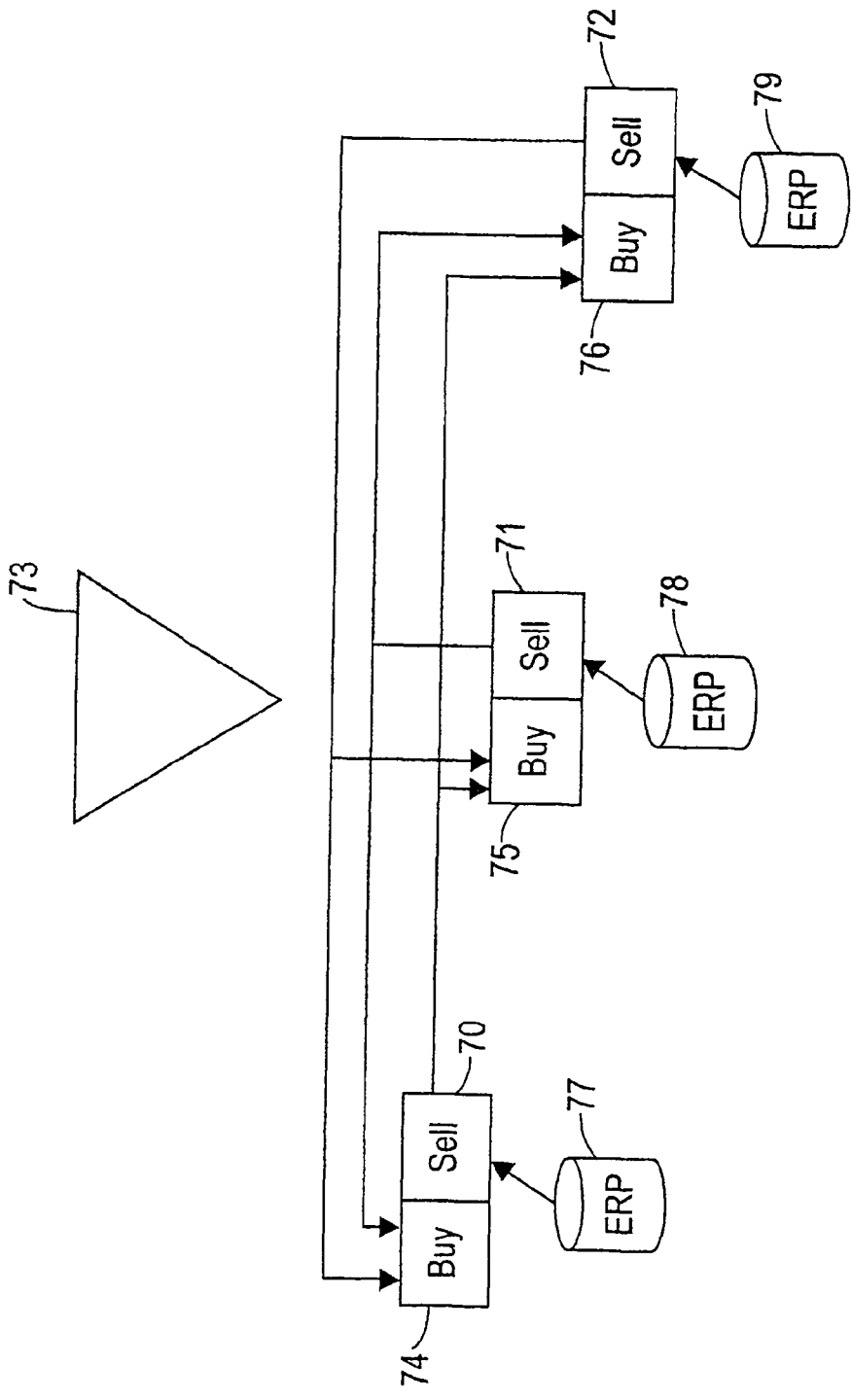
FIG. 4 is a schematic diagram representing the communication flow between the sales module and the procurement module.

FIGS. 2-4 illustrate how the configuration of the system 1 encompasses the relationships that exist between the system's 'market-related' business process activities (the vertical firm to market business relationships) and the system's firm to firm business process activities (the horizontal firm to firm business process axis). The juxtaposition of the two provides the basis for the spatial relationships that occur between:

markets industries firms, and products at the three stages (search, negotiation and post-transaction management) in a commercial/transactional process.

The configuration of these parameters encapsulate the fundamental business process relationships that make-up a 'virtual 'supply-chain'; i.e., the structure is capable of overcoming information asymmetries in order to seek and manage supplier-customer relationships among browser to system as well as system to system purchase and sale interactions. The practical implications of this are that a correct identification and control of these relationships permits the construction of electronic systems that are capable of generating predictable events resulting in expected and rational outcomes that are in dynamic equilibrium (optimal outcomes).

FIG. 2 illustrates the data flow from illustrative supply/sales modules 70 to 72 to a market/search module 73. (Each entry in this figure also includes a procurement module, respectively 74 to 76, and an ERP system, respectively 77 to 79). This data flow represents a micro (1) to macro (many) data relationship. The data originates from each firm's enterprise resource planning (ERP) system 77 to 79 or other equivalent electronic data source. Each supply/sales module 70 to 72 selects appropriate data and converts that data into a content/form that can be used by the market/search module 73.

This function provides the infrastructure for the market/search module 73 to receive firm derived supplier/product information including data updates/refresh on a regular basis. The data flow and content is determined by a sales module based data direction/control function, as will be explained below.

The principle device that controls product/item data flow to the search/directory module 2 is situated in the sales module 3. The control issues relating to outbound data transmission turn upon solving for the broad parameters:

What data (i.e., which product items)

Where that data is to be sent

How often

FIGS. 3 and 4 illustrate how a firm's product/sales item information (what) is sent to two classes of receiver. FIG. 3 shows data flowing to components having a one to many (1:M) data relationship, i.e., search/directories and marketplaces. FIG. 4 shows data being transmitted directly to other firms being a one to one (1:1) data relationship.

The data transmission functions of each sales module 70 to 72 include controlling mechanisms that allow sellers to restrict the data content transmitted to different receivers. For example, sellers will wish to send a large number of their sales product items to marketplaces. By contrast, only selected items may wish to be transmitted to discrete buyers.

Control issues include the frequency of catalogue updates and will vary according to destination type. Search/marketplace data updates may be required on a real-time basis because data will be viewed frequently by large numbers of viewers. On the other hand, product item updates sent to buyers (to refresh their supply-chain catalogues), will be much more restricted in scope.

FIG. 3 is an extension of FIG. 2 and illustrates the movement of discrete data from the search/marketplace 73 to the buyer's modules 74 to 76. The purpose of this function is to provide a data saving mechanism whereby a prospective buyer can build a customized catalogue of numerous items selected from a search/marketplace module 2.

FIG. 4 also illustrates the transmission flow of an electronic transportation function. The transportation function involves the movement of a buyer from a search/marketplace module to a discrete firm's sales module. For example, upon selecting an item listed in the marketplace directory module 2, a buyer that wishes to purchase the item(s) can elect to be transported (with data content) to a sales module. The data content that is transported with the buyer is derived from products it has located in the marketplace/directory and appropriated to electronic requisitions.

As the buyer may be looking at products from more than one seller, this may require the creation of multiple simultaneous requisitions. Therefore, simultaneous transport to multiple sales modules of different seller is possible.

Both the procurement and search/marketplace modules make use of the search module 2 to provide a buyer with functionality that assists it in making a selection decision. The primary search mechanism of the search module 2 is the search/directory component 5, which is designed to select, group and list search results according to a user-selected configuration of industry index, product classification, company/firm and geographical locator codes. All of the generic (non-product or firm specific variables) indices and coding systems used are derived from standard indices recognized and administered by the United Nations Statistical Data Division and private and public statistical agencies.

The search/directory component 5 functions by searching mandatory and optional parameters which the user must specify/select in defining the search criteria. The search/directory component 5 configures the user's selection mandatory and optional search criteria. It produces a simple algorithm that formats the breadth of the search to conform to the governing algorithm.

The search process functions by having the cross-relational algorithm link classes of information. Some of the classes correspond to an existing indexing system, other data classes do not. The data classes and corresponding indices are as follows:

| Data Class | Index |
| --- | --- |
| Industry (Broad) | ISIC (2 digit level) |
| Product | |
| goods | HS (4, 6, 10 digit level) |
| services | CPC (3, 5 digit level) |
| Brand | |
| Company Name | |
| parent | |
| subsidiary | |
| Region | 13 Category Region Code |
| Country | UN 2 alpha code |
| State/Province | UN intra-country code |
| ISDN-telephone area code | Internat. ISDN code |
| Port- Air/Sea/Inland | UN Port Codes |

Each specific product or service entered into the directory will have a separate and unique identifier tag that is derived from the configuration algorithm. The search configuration algorithm distinguishes between companies, products and brands having the same or similar attributes by arranging the relationships between attributes of the governing classes.

For example; numerous similar products (good or service) may fall within the same CPC or HS classification categories. Each particular product item listed in the directory will inherit a unique identifier tag that it derives from the totality of the classification attributes listed in the table above. Even if a product is tagged to a particular manufacturing or service providing enterprise operating across several distribution points, the same product offered across multiple outlets will take on a unique identifier tag for each sale unit.

Accordingly, in order to identify the precise origin of a product, geographical location identifiers can be attached to the product. These can be further cross-referenced to other important geographical identifiers such as nearest ports, airports or distribution hubs all identified by their respective international/domestic classification codes.

Figure 5:
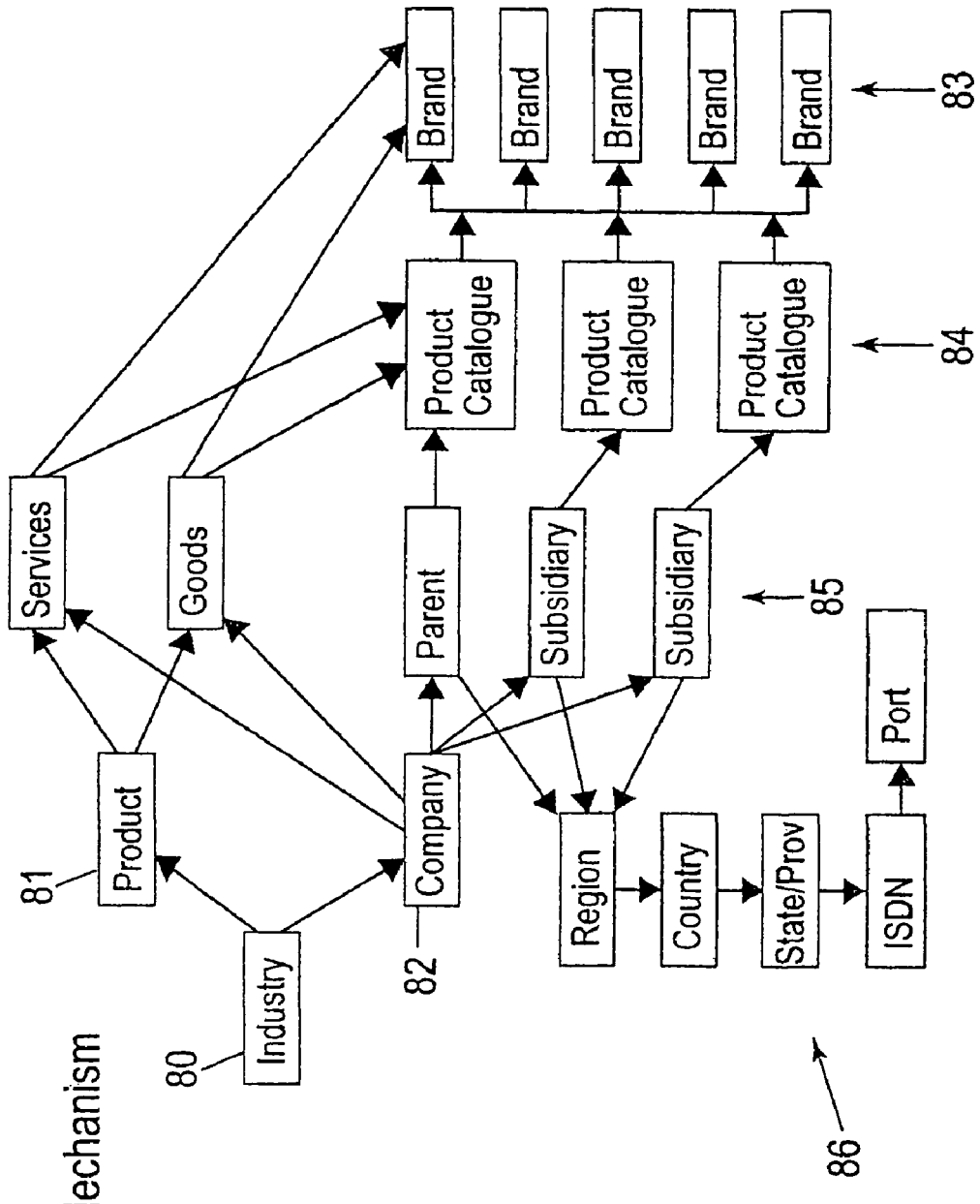
FIG. 5 is a schematic diagram representing the general relationship among search parameters.

FIG. 5 illustrates how the search mechanism of the search/directory module drills down across four levels of organizational form, namely, Industry 80, Product 81, Company 82, and Brand 83.

The cross-relational attributes of the item identifier criteria means that items can be gathered together at various levels of aggregation and disaggregation. Users can therefore enter the system and search either by broad product descriptors 84, industry classification, brand 83, firm 85 or location 86 or any combination of these fields. It is therefore possible for the search mechanism to generate directories and lists by any of these descriptors and classifications.

Moreover these lists or directories can be reported either by location, firm, brand and or industry. In addition cross-comparison of products is straight-forward. Having generated the list of products in the appropriate catalogue, all the information about the products can be readily compared, including reserve price, volume, product characteristics and specifications.

Internet search engines cannot by their very nature perform searches which are able to most accurately and expediently identify prospective commercial trading partners—either sellers or buyers. At present most organizations will conduct searches having a particular type or class of product in mind. Given the number of different types of information and products that may fall within the scope of a general search term, an organization conducting a search for prospective business partners typically ends up wasting a great deal of time sifting and sorting among relevant and irrelevant search results.

The search/directory module 2 provides the ability to narrow the scope of the search considerably using a mechanism that is capable of reducing the search criteria to a level of specificity that accurately reflects the product being searched, and subsequently ranking these result criteria.

To improve this level of specificity a more precise means of conducting a product search is required for having a high degree of precision is by means of a search mechanism that conducts a database search for business enterprises that sell products falling into a product's appropriate Harmonized Tariff Classification (HTC) Code.

The HTC system is a classification index that is internationally recognized and used by customs authorities around the world for the classification of outgoing and incoming goods crossing international or national borders.

The HTC System operates as follows:

| | |
| --- | --- |
| 4 digits | represent the specific industry |
| +2 digits | represent 6 broad product class |
| +2 digits | represent S specific product class |
| +2 digits | represent 10 specific products |

The search/directory module 2 provides prospective buyers with the ability to look up the HTC Code corresponding to the product type (general or specific) of the product they wish to search. Each database search by HTC Code is cross-referenced to industry level. For example, the Standard International Trade Classification system (SITC) and business enterprise name criteria enable the searcher to further narrow the search criteria. Conversely, all searches by business enterprise name or general product description will be cross-reference to the HTC Code. Therefore, the common search criteria of all products contained in the product search database are each product's discrete HTC Code. Thus we will build the first product search engine based upon the HTC Code.

The search/directory module 2 uses the HTC system as well as other overlaying parameters built into the search mechanism, thus creating increased levels of functionality and dynamism. The results are to be categorized by a ranking system based upon preferential outcomes selected by the user.

The search/directory module 2 is preferably case sensitive and requires at least one field to contain data before the search can be activated. Once the search criteria are completed the user ranks the search numerically. This ranking of search parameters creates dynamic outcomes not available with current search mechanisms. A cross referencing mechanism matches procurement requirements with search items based on product type, price, volume, payment terms, geographical location.

Additional flexibility may be built into this search mechanism whereby no fields require mandatory inputs. Additional fields can be nominated/included at the time of the search to create an increased spectrum of result criteria. This increased level of dynamism with the search provides for the user the optimum outcome. This may result in unexpected outcomes based upon expected values.

The greater the specificity of the search criteria ultimately provides expanded search results generated from the flexibility created from within the search mechanism.

The search function can be supplemented by expert system functionality able to categorize and rank search outcomes according to the users preferences.

The procurement module 4 is a processing mechanism that handles the demand-oriented procurement requirements of a single firm. It matches the firm's demand requirements with product and service items that it must obtain from sources external to the firm. The search/directory functions of the search/directory module 2, operating in conjunction with procurement module functions of the procurement module 4, provides the specific sources of products and services that the firm can procure.

Procurement items are obtained from three sources of supply within the system:
  Items saved from the marketplace/directory searches
  Items saved from sales modules searches or transmission
  Items entered directly into the procurement module by non-system browser access clients These three external sources of items provide the pool (supply) of potential items for purchase by the firm that may be used to satisfy the demand requirements of the firm.

However, a firm's procurement requirements are derived from factors internal to the firm arising from its operating and production activities. The procurement module 4 distinguishes between two broad types of procurement requirements, namely stock items and non-stock items, respectively handled by the stock component 33 and the non-stock component 32.

Stock item requisitions are made as a result of the depletion of product items (inventory) that a firm uses direct result its manufacturing or production activities; i.e., are items that are transformed and/or undergo a value-adding process in the course of producing another product. Non-stock items are products that a firm consumes as an indirect result of its daily activities. Non-stock items include maintenance, repair and overhead (MRO) items such as stationary, computer support items etc.

In addition, the procurement module 4 handles two broad types of purchase orders:
  Blanket (or standing) purchase orders
  One-off (or standard) purchase orders The procurement module 4 coordinates the firm's internal demand requirements and provides a mechanism by which these internal demand requirements can be matched with the externally acquired pool of required items.

Figure 6:
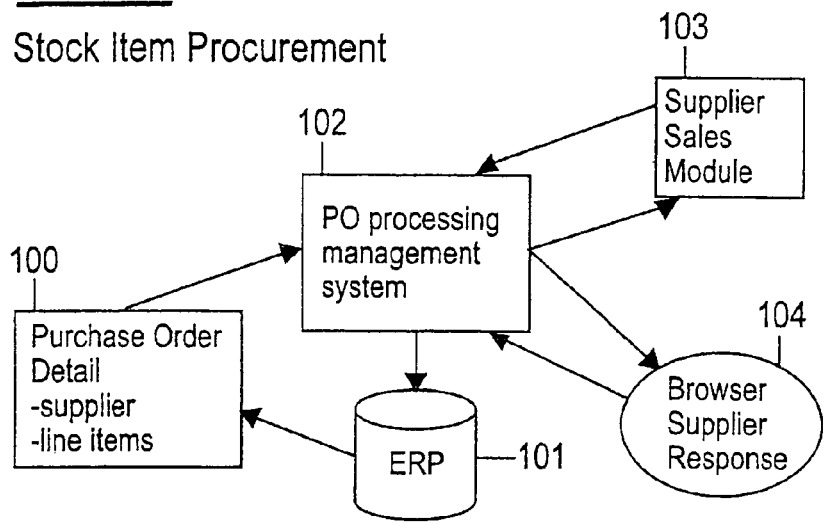
FIG. 6 is a schematic diagram representing a generalization of the direct stock procurement functions.

FIG. 6 is a diagram of the general process flow of the direct stock procurement process. The demand for stock items is derived at step 100 from processes that occur within a firm's back-office systems (usually an ERP system 101). The ERP contains a list of direct-stock product items and indicates when stock must be replenished. The procurement module 4 functions by matching the firm's direct-stock product item requirements with:
  items supplied by current suppliers
  items supplied by potential suppliers The method and source of the matching process depends upon whether:
  an existing blanket purchase order is to be extended
  a new blanket purchase order is to be created
  a one-off purchase order is to be created Additional functionality permits the procurement requisition to be fulfilled to conform to business process requirements as to whether:
  a quotation price is required
  a tender process must be followed
  and whereby inbound quotes and tenders are determined on the basis of a dynamic, reverse negotiating process.

The supply of stock items is derived from the three external sources identified above. The method of matching is dependant upon the business process functions which are required to be met under the particular circumstances of the specific procurement requirements. Once the purchase order is made at step 102, sent and confirmed by suppliers 103 and 104, its confirmation is processed back into the ERP system 100.

Figure 7:
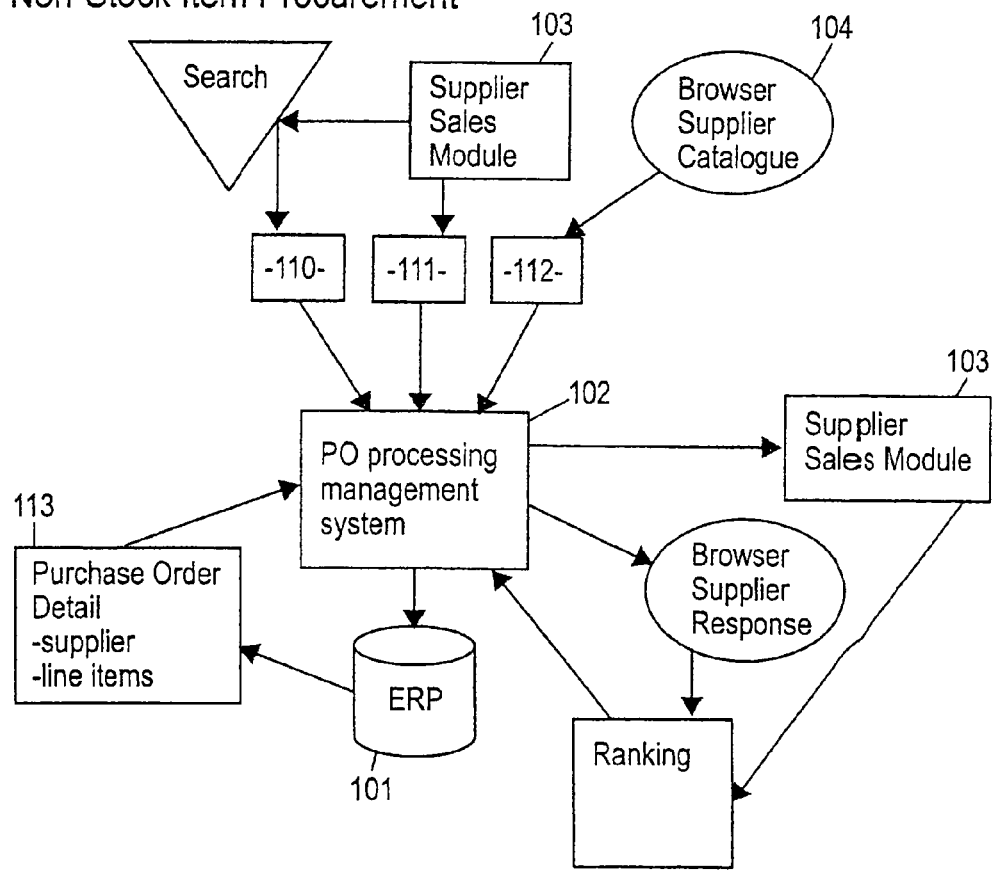
FIG. 7 is a schematic diagram representing a generalization of the indirect stock (non-stock) procurement functions.

FIG. 7 is a diagram of the genera) process flow of the indirect or non-stock procurement process. The demand for non-stock items is derived from processes that occur as a result of consumption as a result of organizational and operational factors within a firm. It is frequently the case that inventory management of consumption of non-stock items are not as sensitive and accurate as is the case with stock-items. The demand for non-stock items is derived from specific operating units 110 to 112 within the firm. The list of non-stock product items within the ERP 101 is generalized to product type and category rather than at a highly specific level as it is with stock items.

Demand for non-stock items is derived from members of the firm who recognize replenishment is required. Requisition of non-stock items is usually initiated by the member rather than the ER? or back-office functions (but is may be the case that the ERP initiates some purchase requirements).

The procurement module 4 provides a mechanism by which a non-stock requisition can be created at step 113 by the initiating member. The requisition is formed according to the results of a matching of the requisition product item requirements with:
  items supplied by current suppliers
  items supplied by potential suppliers Additional functionality permits the procurement requisition to be fulfilled to conform to business process requirements as to whether:
  a quotation price is required
  a tender process must be followed and whereby inbound quotes and tenders are determined on the basis of a dynamic, reverse negotiating process.

The supply of non-stock items is derived from the three external sources identified above. The method of matching is dependant upon the business process functions which are required to be met under the particular circumstances of the specific procurement requirements.

Once the purchase order is made, sent and confirmed by the supplier, its confirmation is processed back into the ERP (back-office) systems.

Figure 8:
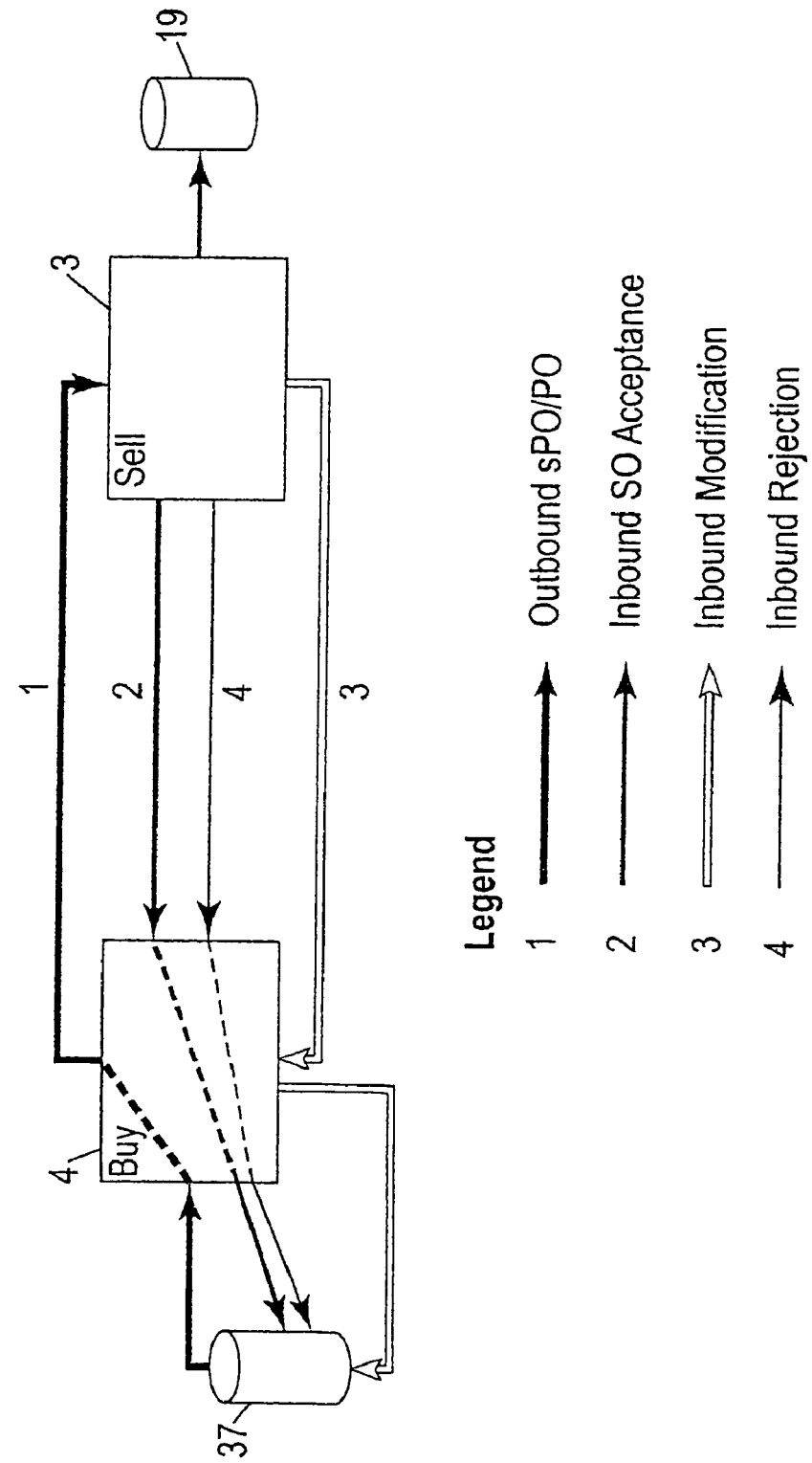
FIG. 8 is a schematic diagram representing the relationship among the different aspects of the sales module and the procurement module.

FIG. 8 is a diagram illustrating the operation of the sales module 3 shown in FIG. 1. The sales module 3 is a device that performs supply-side functions that either 'stand-alone' to configure and execute a sales transaction; or function in concert with a procurement module to provide an increased level of automated transaction processing. A buyer can be transported to the sales module 3 via the transportation mechanism from a search/directory module 2 or procurement module 4; alternatively, a buyer can enter the sales module via direct browser access.

In all cases, the buyer-client selects a list of items according to a series of business case rules or navigational choices and creates a product requisition form. The item selection process will, by implication, generate a list of items that the buyer-client configures according to its requirements. If transported from a procurement module 4 or search/directory module 2, the buyer will have partially configured a requisition. The requisition contains data to be used for the purposes of obtaining a quotation, demonstration order or outright purchase (negotiation).

The item selection list, by implication, is the same data that will be contained in a sales order invoice. The sales order is the configuration of data that will be processed as the final sales terms and conditions between the buyer and seller. The sales order is also processed in the ERP as a discrete transactional outcome.

The population of item data within the sales module is derived directly from data obtained from the ERP (thus avoiding data duplication).

Upon completing a requisition, a registration process must occur before the buyer can proceed with the transaction. If the buyer has been transported from a procurement or search/directory module, registration is automatic. The registration data is matched to customer/sales related data in the seller-firm's ERF consistent with, and to be used for, customer relations management (CRM) functions/purposes.

At this stage, the requisition is made according to an unadjusted order price. This is the base price upon which further price-related adjustments will be made subject to the functions described below, A provisional sales order number is allocated to the requisition (now becoming a provisional sales order).

The provisional sales order is provisional for several reasons. One reason is that its initial purpose is derived from that fact that the buyer-client may wish to obtain a quotation only. The seller's quotation price must be competitive, but not be the last price-related say; i.e., further price adjustments may be made at a later step in the process; i.e., final negotiation.

At the quotation stage system generated adjustments for:
        volume purchases (ERP data)
        customer status discounts—i.e., if the customer is known and good—a discount may apply.

The system computes the quotation price by taking the unadjusted provisional sales order price and then deducting appropriate rebates.

No price adjustment is mandatory—only occurs if volume and customer class rebates apply. The system computes the quotation price. A quotation number is generated by the system and the provisional sales order is stored in the system under the system assigned quotation number.

The buyer is provided with the quotation number and the quotation details and the quotation amount. The buyer should be able to leave and access the system calling up the provisional sales order at a later time by inputting a password and sales order number.

The buyer may, before or after viewing the quote, change their mind and wish to re-configure their order. Functionality allowing the buyer to add/delete items in the sales order list is provided.

If a buyer selects a request for quotation, a second, parallel, quotation function is set in motion being a quotation for ancillary service contracts such as transport/logistics, insurance, finance and inspection.

The services contract quotations are calculated using system data derived from the core sales contract plus:
    shipment details, including price, etc.
    cargo type
    cargo weight and volume data, etc.

The sales module automatically determines whether the sales contract is domestic or international by conducting a cross-check between country of origin (i.e., seller's location) and country of destination.

The buyer (or ERP) will fill in the additional required information.
    Place of loading (domestic)
    Place of discharge (domestic)
    Port of loading (international)
    Port of discharge (international)
    Inland freight required from port to plant (if sea or air)
    Container type—general or refrigerated (if sea)
    Estimated time of departure (ERP lead-time+one week)

The buyer will check the information and select the send quote to shipping agent or forwarder. The shipping agent will be sent an email notifying him that a new RFQ has been posted to his URL/access site.

The vast majority of international and domestic commercial transactions undertaken between business entities (B2B transactions) fall into the category of intermediate goods trade. Intermediate goods trade refers to B2B trade of primary, or secondary non-finished goods requiring further processing to create a marketable finished product.

International and domestic intermediate goods trade is dominated by the pricing decision. The pricing-decision is the core decision of the transaction process. It involves a price-setting decision on the part of the seller, and a price-bidding decision on the part of the buyer. The ultimate buyer will undertake a comparative and competitive market analysis and, subsequently, make a conscious and calculated pricing decision. A seller, on the other hand, will set an indicative price, which, under typical circumstances is broadly calculated on a cost plus profit basis. The price spread between the seller's preferred selling price and the buyer's offer price is the negotiable margin.

However, in addition to price, intermediate goods transactions are frequently complex and additional factors are part of any transaction. These factors include, for example:
    volume
    the method of payment, i.e.,
        pre-payment
        letter of credit
        documentary collections
        open account;
    credit terms; i.e.,
        30, 60, 90, 120, 180 or more days
    credit rates of interest
    transport and logistics charges
    insurance charges inspection charges
banking and finance related charges
country and credit risk adjustments In an international trade negotiation buyers and sellers effectively negotiate a transaction involving multiple factors, which generally include the following variables, though may include several others:
Price
Volume
Payment Method
Time terms
Credit terms Additional negotiating terms can be either added or excluded from the negotiation depending on whether the transaction is an international, domestic or intra-firm (international or domestic) negotiation. The transaction embodiment provides the ability to negotiate over a range of variables. It operates in real-time and is capable of being used by multiple users simultaneously. All functions are conducted in a systematic manner that is consistent with the well-known international standards Incoterms 2000 and the CP 500 requirements.

The system 1 provides a mechanism by which buyers and sellers can negotiate an agreed set of contractual outcomes covering price and all price-related aspects of the contract.

A feature of the system 1 is that it can operate at three levels:
As a multi-buyer and/or multi seller multiparametric auction
As a single buyer to single seller multiparametric negotiation game.
As a simultaneous combination of the multiparametric auction and the multiparametric negotiation game.

The auction aspect of the system 1 may use any one of the standard auction design rules, which will be chosen by the seller in advance. For instance the seller may choose to sell the product using the rules of any one of the "English" auction, the "Dutch" auction, the "sealed-bid" auction or the "Vickrey" auction. The type of auction will be chosen by the seller and communicated to the buyers in advance. However, the major original method by which the auction is instigated in the transaction hub comes from the method by which sell offers and buy bids are entered and resolved and the number of variables included in the auction process.

(a) Setting the Seller's Reserve Offer

In order for the system 1 to begin to perform its operations, the seller specifies values for the relevant trading parameters over which it has influence in an international trade negotiation. In an international trade transaction the seller is not only interested in price, but also the following additional variables: volume; payment method; time terms; and credit terms (as well as, perhaps, several others).

For example, a seller may be prepared to accept a lower price if the seller can sell a greater volume or get more favourable payment terms. Therefore, it is usual for a seller, during the course of a negotiation, to make expected value calculations over a wide range of different combinations of these variables. The system 1 provides an automated process of preference calculation by allowing sellers to transparently reveal to themselves the values placed on the various components of any offer and then to verify that their preference ordering is consistent and non-reflexive.

In determining the final outcome of the negotiation, it is possible that the computer optimizing algorithm used in the system 1 will generate a combination of price, payment methods, credit terms, credit rates of interest etc that was not be anticipated or thought of by the human being who sets the parameter values for the sell offer. Because there are many thousands of possible combinations and permutations, a partly or completely non-reflexive preference ordering over all preferences may be generated. The seller (with the aid of the computer) identifies all those possible combinations of the parameter values that are of equal expected value, most particularly those covering the reserve offer. That is, once the seller has chosen one combination of parameter values that represent the preferred reserve offer ($O_1$), the seller should then be able to identify readily other parameter values that generate an identical expected value calculation such that a second reserve offer (02), third reserve offer (03), and other reserve offers are of equivalent value.

Figure 11:
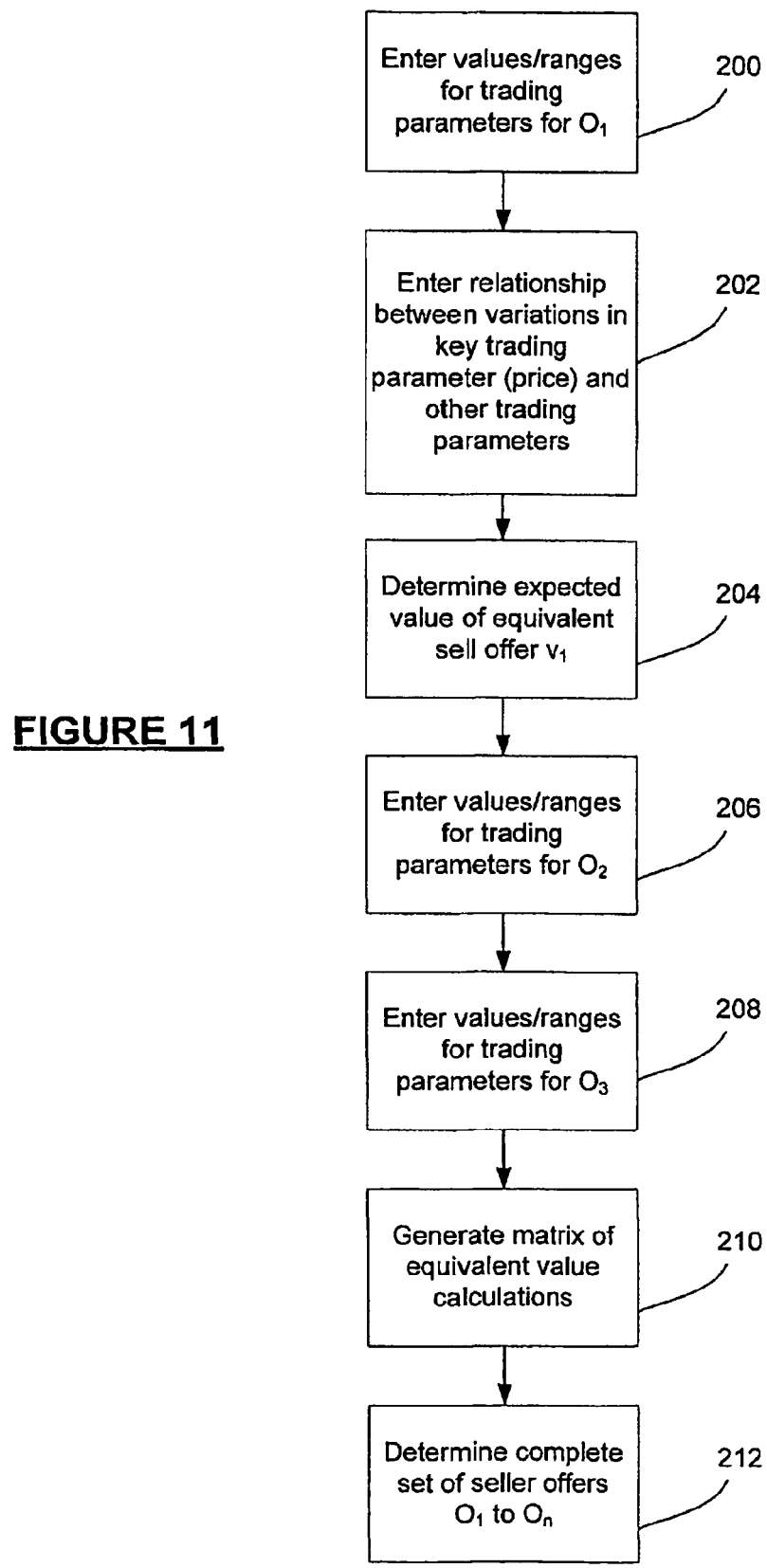
FIG. 11 is a flow chart showing steps carried out by the system during the development of a set of seller offers.
Figure 12:
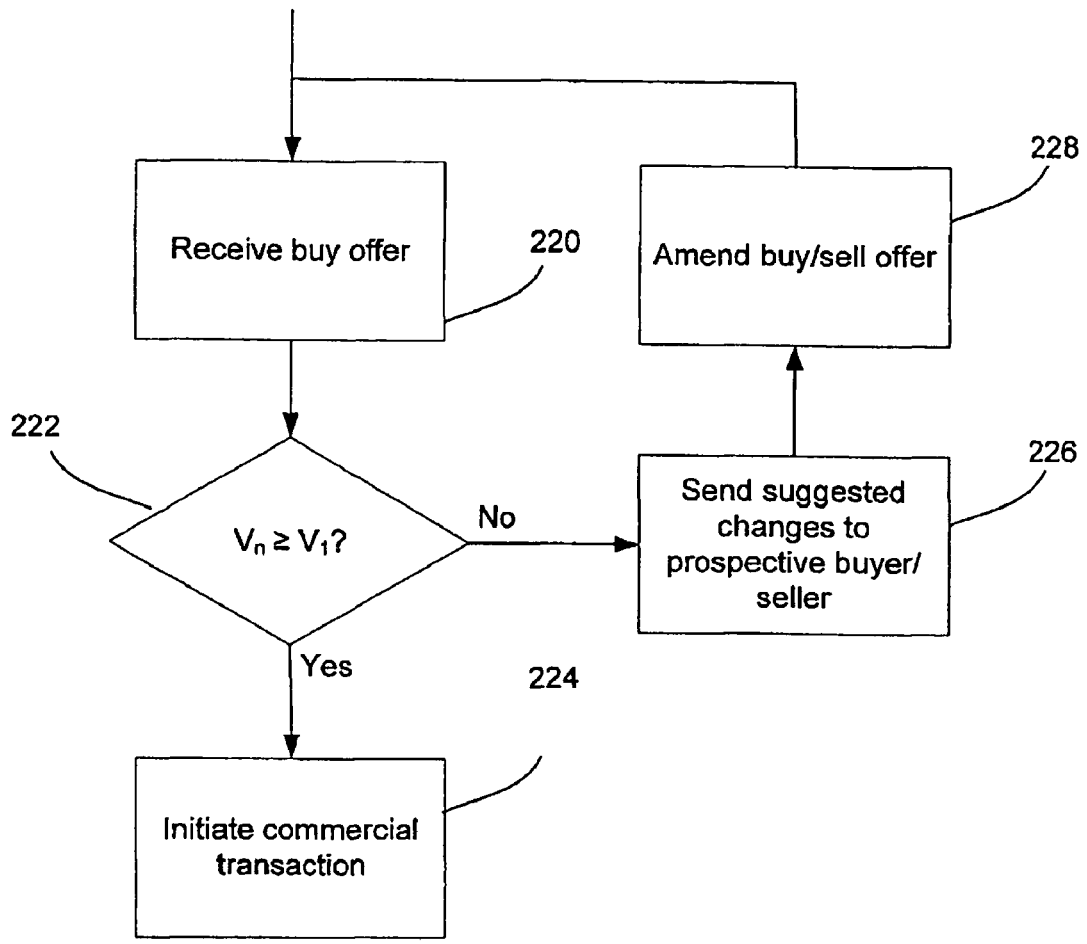
FIG. 12 is a flow chart showing steps carried out by the system during negotiation of a commercial transaction.

In an exemplary embodiment shown in FIG. 11, a seller enters values for all variables of its most preferred reserve offer (O~) at step 200. This is the offer that the seller would be happy to accept if it were offered by any buyer.

The seller is required to enter a value for each of the following, where they apply:
price
volume and volume price reductions, where they apply
the method of payment, i.e.
pre-payment
letter of credit
documentary collections
open account;
credit terms; i.e.
30, 60, 90, 120, 180 or more days
credit rates of interest
transport and logistics charges
insurance charges
inspection charges
banking and finance related charges
country and credit risk adjustments As part of this initial value setting, the seller indicates at step 202 the precise fractional relationship between the change in price and change in each of the variables that directly (in either a linear or non-linear relationship) affect the determination of price:
volume;
The seller indicates the percentage volume discount on price for a range of different volumes, all other variables held constant (this will generate a simple linear or non-linear function of price change as a function of volume)
method of payment;
The seller indicates the percentage price increase, from the base price, contained in 01, associated with each payment method beyond pre-payment such as letter of credit, documentary collections open account, all other variables held constant (this will generate a linear or non-linear function of price change as a function of payment method)
credit terms;
The seller indicates the percentage increase in price associated with the increase of time beyond 0 days such as 30, 60, 90, 120, 180 or more days, all other variables held constant (this will generate a simple linear or non-linear function of price change as a function of time terms)
credit rates of interest;
The seller indicates the percentage increase in price associated with interest penalties over time, all other variables held constant (this will generate a simple linear or non-linear function of price change as a function of interest premiums).

The system 1 then determines an expected value for this sell offer, say v1 at step 204. At the conclusion of step 1 the seller has specified information on the preferred reserve offer and the way important price-related variables such as volume and method of payment impact upon price change. With this revealed preference information, the system 1 is able to generate all possible combinations of the parameters that will generate offers of equal expected value using a standard maximum likelihood algorithm.

The system 1 now gives the seller a chance to check revealed preferences by allowing the seller to enters, at step 206, values for all relevant variables, but with a slightly higher price and altered values, where relevant, for other terms, say for example less favourable payment terms, representing an alternative offer, ($O_2$) which is identical in expected value to $v_1=O_1O_2$. Importantly this offer is considered to be of equal value in the sense that the seller is no worse off than in the case of $O_1$.

Using the maximum likelihood algorithm the computer is able to check the new values against the preferences revealed in Step 1 for consistency. The system 1 will indicate to the seller if there are any inconsistencies and allow the seller the chance to correct inconsistent values. After repeating this exercise a small number of times, the computer maximum likelihood algorithm will generate a complete set of non-reflexive preference orderings.

Seller now repeats Step 2 and, at step 208, enters values for all relevant variables, but with a slightly higher price and altered values for other terms representing an alternative offer, ($O_3$) which is identical in expected value to $v_1=O_1=O_2=O_3$.

Once this process is completed, the seller has effectively established a system of functional relationships between variations in a key trading parameter and one or more other trading parameters which may be represented as a system of simultaneous equations whereby price is a function of a range of variables and changes in price are functions of a range of other, but related variables. Using any one of a number of standard maximum likelihood techniques such as Newton-Raphson or the Genetic algorithm parameter approach, a matrix of equivalent value calculations can be generated, at step 210, for every possible permutation or combination of the variables included in the sell offer process. This means that the complete equivalence of value will be revealed for every possible combination of price and the various other terms identified above as part of this reserve offer calculation.

At the end of this process we have, at step 212, a complete set of seller offers $O_1, \ldots O_n$, covering all possible combinations of the trade variables that generate offers that are equivalent in value, $v_1$. This means that it is relatively straight forward by essentially interpolating between $O_1, \ldots O_n$ in a multi-dimensional space, to compare any bid from any buyer and determine whether it is above the seller's reserve offer, $v_2 > v_1$, or below the reserve offer, $v_2 < v_1$, irrespective of the composition of the offer.

EXAMPLE

Consider a simple hypothetical example. Assume that a seller enters initial values for the preferred reserve offer which include a price of $10 per unit, to be paid by letter of credit on 60 days at an effective credit rate of interest of 10%. As part of the initial value setting the seller also indicates the percentage price increase required if the payment method is not letter of credit but rather documentary collections or open account, or if the payment is by letter of credit but on less favourable time terms such as 90 days. With this revealed information the system 1, using a maximum likelihood estimator, is able to identify other equivalent reserve offers which, for example, might be a price of $11 per unit by letter of credit on 90 days at an effective interest rate of 12%. In other words the computer is able to determine different combinations of price, payment method, time terms etc that are of equivalent value to the seller's initial reserve offer and all combinations of the variables that are superior and inferior to the reserve offer.

Once the seller has completed the exercise of determining its reserve offers, the seller may now choose to indicate that it has product to offer for auction, or sale and may begin negotiating directly with a potential buyer, or do both.

The Single Seller Auction Scenario

Having specified that it has product to sell and it wishes to proceed with an auction, the seller now posts this information to the product catalogue.

Step 1: Seller Indicates the Type of Auction and Auction Rules

The seller may choose to sell the product using any of the "English" auction, the "Dutch" auction, the "sealed-bid" auction or the "Vickrey" auction rules.

Step 2: Bids Come in from Buyers

As seen in FIG. 11, bids are received from prospective buyers at step 220. The auction remains open for a specified time or until there is a bid of value $v_n \geq v_1$ at step 222. In this case, a commercial transaction between the seller and buyer is initiated, at step 224. In the same way that the seller specifies values for the variables: volume; Payment Method; Time terms; and Credit terms, etc., the buyer must also enter a bid that indicates values for each of the relevant terms to an international transaction. Depending upon the rules of the auction, certain information will be revealed to all market participants. However, as each unsuccessful bid comes in, the owner of that bid will receive feedback at step 226 about their bid and what they might change, or increase at step 228 in order to make the bid closer to the reserve offer of the seller. For example a buyer might receive advice to either reduce time terms from say 90 days to 60 days or slightly increase price or some combination of the two.

Note, the reserve offer of the seller is not revealed to the bidders. At the end of this process, the product will be sold to the highest bidder measured by the extent to which the winning bid exceeds the reserve offer. Where there are two identical winning bids the bid received first will be the successful bid or the market did not clear. When the market does not clear then the seller has the choice of beginning the process over again or, alternatively, to begin negotiating directly with one or more of the potential buyers.

The Single Seller-Single Buyer Negotiation Scenario

In many real world trade situations the buyer and seller are well known to each other and often have a long-standing trading relationship. In these cases they may wish to begin to negotiate directly with each other. The system 1 designed to deal with just such situations. In this sense the system 1 provides the mechanism to undertake a bilateral bargaining game. The bilateral bargaining game may take one of several forms and again the rules covering the negotiation would be agreed in advance of the formal commencement of the bargain. Importantly, in the bargaining games/negotiation scenario, the buyer may reveal bids in a manner similar to the way the seller reveals preferences. In the transaction hub the bargaining/negotiation game may take one of the following forms:

- an alternating-offer bargaining game instigated by the buyer (requiring real time on-line access by both buyer and seller)
- an alternating-offer bargaining game instigated by the seller (requiring real time on-line access by both buyer and seller)
- a single-offer bargaining game instigated by the buyer (requiring real time on-line access by the seller only)

a single-offer bargaining game instigated by the seller (requiring real time on-line access by the buyer only)

a cooperative game instigated by either party and with an agreed arbitrator (the transaction hub via the computer itself).

In these bargaining games, an international trade transaction operates by means of a multiparametric negotiation, as explained above. The bargaining is not constrained to a single variable, price, but rather embraces all the variables relevant to an international trade transaction. In this case, though, the bargaining framework involves a cooperative game instigated by either party and with an agreed arbitrator, whereas the transaction hub is both the vehicle through which the negotiation occurs and the arbitrator to the negotiation.

In the bargaining/negotiation games buyers and sellers can negotiate over the whole range of international trade terms identified above. The process may begin with either the seller, who has set the reserve offers $O_1$ to $O_n$, with equivalent value, $v_1$, or with the buyer, who undertakes a similar process to the seller, in order to specify maximum bids, $B_1$ to $B_2$ with equivalent value, $v_k$ beyond which the buyer is not prepared to go. As long as $v_k \geq v_1$ then a bargain can occur and there is room for negotiation.

Where $v_k \geq v_1$ then a bargain/negotiation may take place and the computer will feed back to both sides the need to change values. For example, hypothetically, the computer may indicate to the seller to slightly lower price and the buyer to slightly improve payment time terms from say 90 days to 60 days.

The buyer and seller may bargain themselves, with advice from the computer, or let the transaction hub assist them to come up with a satisfactory solution that is at least no worse than the outcome they would have achieved bargaining on their own, and most likely to be more favourable to both parties, all other things held equal.

In order to assist in the arbitration process, the seller and the buyer each reveal some additional information relating to the terms over which they are negotiating.

Both the seller and buyer will each have to allocate simple arithmetic weights to each of the terms over which they are negotiating. Consider the following simple example:

| Price | Payment Method | Credit Time Terms | Interest Terms | Σ |
|---|---|---|---|---|
| A | b | C | D | 1 |

The weights a+b+c+d=1. This information, plus the information revealed by the seller and buyer when specifying their respective pricing functions will be used by the system 1, using a genetic algorithm parameter framework, to find the most favourable outcome over price and all related terms to the negotiation. It is possible for there to be more than one outcome. Where there are several outcomes of equivalent expected value then the computer will choose one at random.

Once the system 1 has been in use for some time and has built up a profile of previous successful transactions this information can be interrogated to assist in facilitating further successful transactions. Desirably, neural network functionality is used to augment the optimization process.

It will also be possible for the seller to undertake both an auction and a negotiation simultaneously, and to undertake multiple negotiations simultaneously.

Post-Negotiation Transaction Processing

Direct Purchase and Sales Order Processing

This section describes the process flow and data specifications for the configuration and transmission of purchase order and corresponding sales order data between a buyer's procurement and seller's sales modules.

These functions originate from mechanisms contained within the procurement module 4 and sales module 3. After a purchase order (PO) draw-down (for a one-off or blanket purchase order (BPO)) has occurred within the ERP 37 (or is manually interfaced), the PO details appear in the procurement module 4 ready for processing. This outbound PO is to be delivered from the originating procurement to the appropriate sales module.

The procurement module 4 recognizes and distinguishes between outbound PO's to be delivered to suppliers that do not have a sales module as well as outbound PO's to be delivered to a sales module.

The buy-side administrator will receive the P0 (in the normal course of events, which will appear in the buy-side outbound P0 interface). The administrator will check the order (i.e., requisitioned items) and seller details. If all appear to be correct and no critical data has been omitted from the order, the administrator selects the 'process order' function.

The 'process order' function will activate a process whereby the PU data will then be transmitted to the appropriate sell-side platform where it will be received and processed (on the sell-side platform) in a manner described below.

The sales module 3 contains functionality that enables the receipt of inbound purchase orders in the form of inbound sales-order administration functions. Inbound P0's (i.e., on the sell-side) are presented to the system administrator via the inbound sales order screen. The system administrator performs an order approval process. The sell-side administrator checks the order details and seller details. If all appear to be correct and no critical data has been omitted from the order, the administrator selects the 'process order' function. If the order appears to be correct, it can be processed to the ERP. A sales order confirmation will then be transmitted back to the buyer.

The confirmation will be communicated back to the buyer as an order status code. For example;

accepted orders=status code 1 amended orders=status code 2 rejected orders=status code 3

If the order is not accepted, the functionality below will be required. In some circumstances, the seller may not be able to fulfill the order as presented. The seller/administrator has two options:

amend the order reject the order

Functionality to permit the seller/administrator to change/amend the volume requested by the buyer in the original P0 is provided. The seller/administrator will select the 'amend order' button. Selection will enable the volume field to be changed. If the order volume is changed, the amended order volume change must be communicated back to the buyer's procurement module.

The data, therefore to be communicated back to the buyer's procurement module is the changed volume and status code 2 data. Once received by the buyer, existing functionality already contained in the buy-side system is activated.

If the order is to be rejected, the seller/administrator will select the 'reject order' button. Selection will terminate the transaction. This is communicated back to the buyer.

The data flows inherent in the order rejection function are straight-forward. It requires that the appropriate status code; i.e., 3, be transmitted back to the buyer's procurement module.

Messages back to the buyer's procurement module 4 appear as inbound PO confirmation functions. An order that has been accepted by a sales module is communicated back to a procurement module as an order having a status code=1, being a straight acceptance. The buy-side administrator can view the order details and then proceed with the 'process order' function which will process the order back into the buyer's ERP 37.

An amended order will be communicated back to the procurement module as:
- a status code 2 and
- including the amended volume data The amended order is communicated to the buyer/administrator in the buyer-side 'inbound notifications' screen as an 'amended purchase order' in the 'inbound notifications' interface of the procurement module. The buy-side administrator can view the order details:
- proceed with the 'process order' function (which will process the order back into the buyer's ERP), or;
- terminate the order (and begin conventional non-online discussions with supplier—this may involve breach of contract at this stage and require manual intervention.

A rejected order will be communicated back to the buy-side platform as a status code 3 rejection. The rejected order is communicated to the buyer/administrator via the buyer-side 'inbound notifications' screen as a 'a rejected purchase order'.

This will constitute a breach of contract and require manual intervention.

Post-Negotiation

Figure 10A:
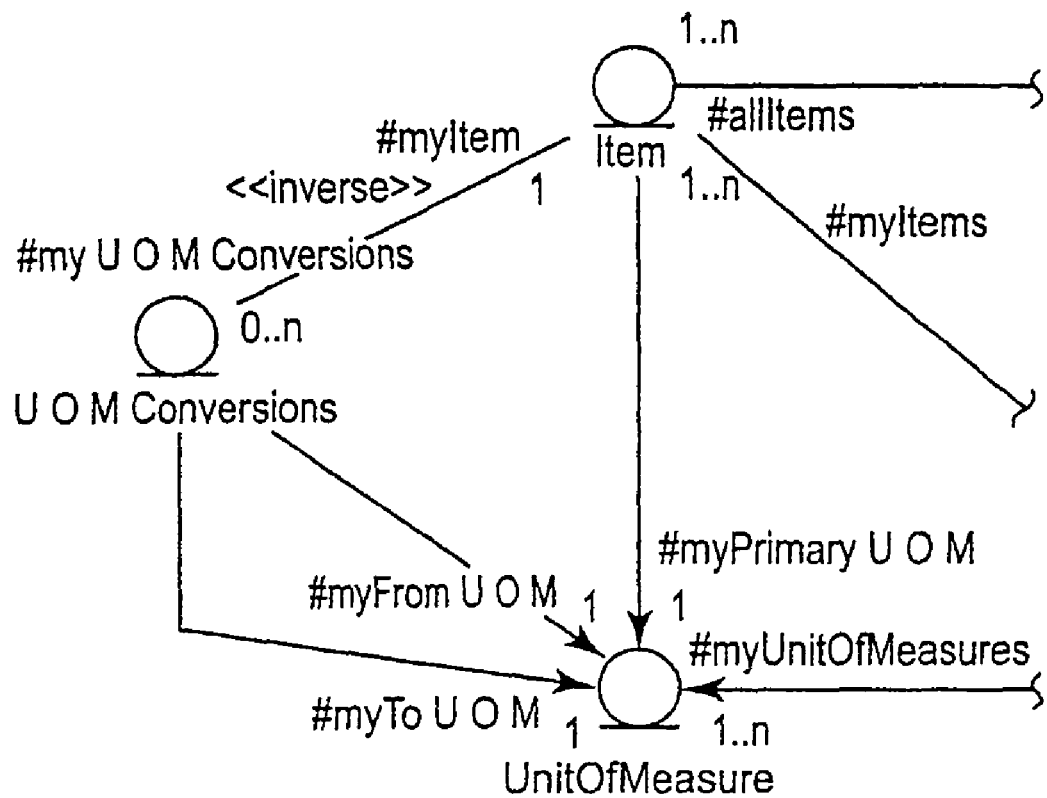
FIG. 10 is a schematic diagram representing a post-negotiation function of an embodiment of the invention.
Figure 10B:
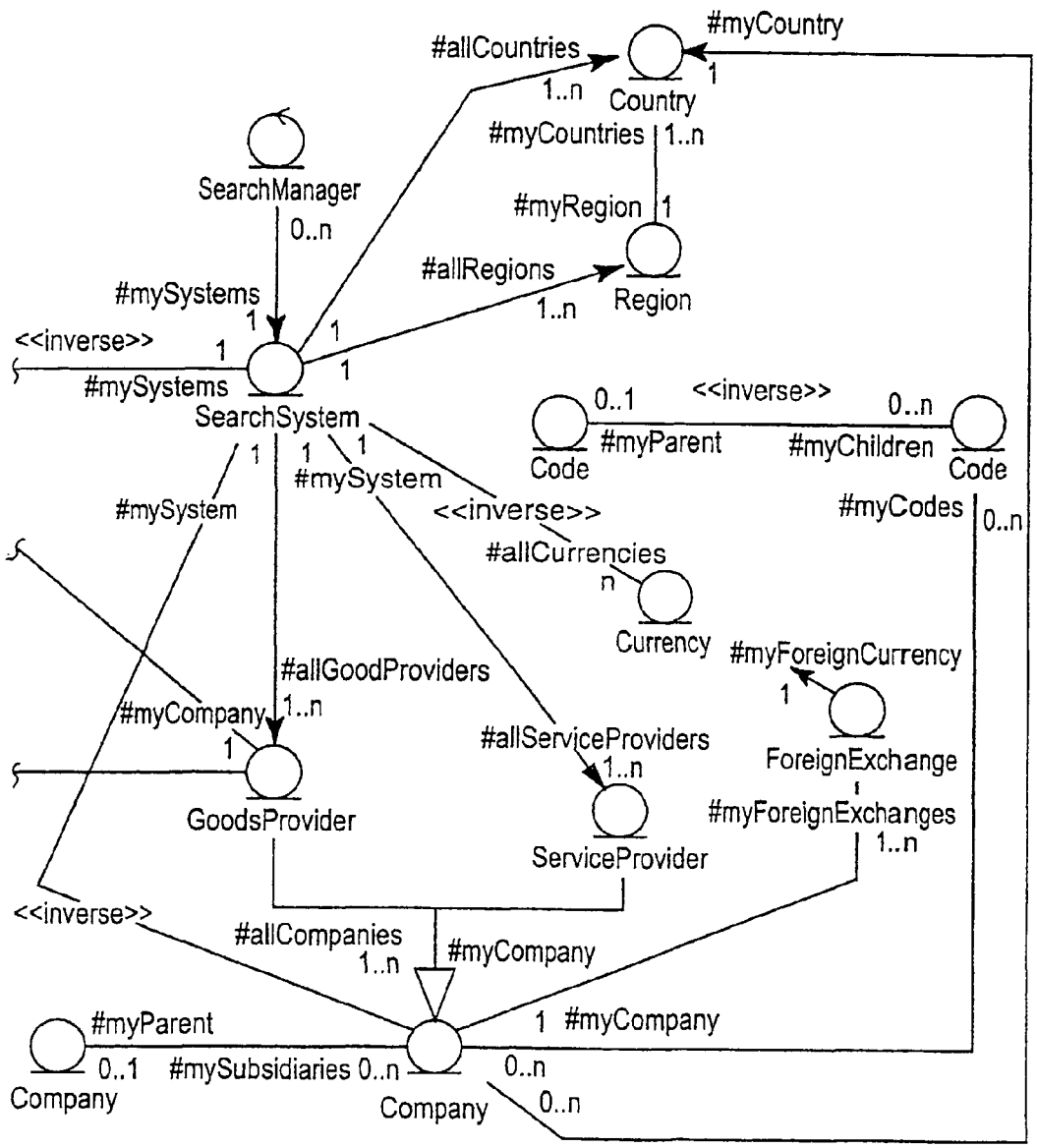

In the post negotiation phase of the transaction, as illustrated in FIG. 10 various ancillary transaction pre-conditions and requirements must be satisfied before the core contract is executed. Negotiated contract requirements must be co-ordinated and performed before the movement of goods can occur.

The core contract has terms and conditions negotiated between the parties to a sales contract. These may include:
- parties to the contract,
- description of the goods,
- volume
- price
- payment terms The terms upon which payment is to be made from the buyer to the seller is the link between the core contract and several related contracts are likely to be made with third parties. Although these related sub-contracts facilitate the ultimate execution of the core contract, this core contract is of course executed according to the payment terms specified in the core contract. In essence, proper execution of the sub-contracts effectively acts as "conditions" to the core contract, and must be satisfied by the appropriate party.

These appropriate parties are respectively involved in various post-negotiation functions. These include:
- transport and shipping
- insurance
- inspection
- credit and banking In a mechanistic sense, if the satisfaction of the core conditions which correspond to each of the sub-contracts is incorporated within an automated business process in a logical manner, the sequential satisfaction of the sub-contracts can be viewed as a lock-and-key mechanism. This sequence can be formatted in a manner to ensure that the automated process does not occur without the proper checks and balances having taken place.

The lock and key logic underlying the automation of the post-transaction consolidation process is also critical to establishing the precise point at which the risk of loss, ownership title and payment obligations pass from the seller to the buyer.

Taken one step further this is also the precise point in the automation process at which a direct interface with external "digital" banking systems can be established and, in accordance with contractual terms, instructions to shift funds from the buyer to the seller can occur.

Finally, the above also implies that it is this point in the business process at which financial data can be allocated within the business process back into the buyer and seller's internal financial management and accounting systems.

Prior to the negotiation, the buyer inputs information relating to its identity. In addition, by selecting a product, key product information is identified by the system relating to the precise identification and description of the goods the buyer wishes to purchase. At the conclusion of the transaction negotiation, offers submitted by the buyer will be either rejected or accepted by the program. An offer that is accepted by the program will contain all the core terms of the sales contract being:
- identities of the parties to the contract
- identification of the subject matter of the contract
- price, volume and payment terms This information will be consolidated and form the content of a proforma Invoice which the seller sends to the buyer to confirm receipt of the order and acceptance of the terms offered. All data is already stored or generated within the system.

At this point in the process, the core contract is concluded and the influence of the several sub-contracts (mentioned above) dome into play.

As mentioned above, each of the sub-contracts performs an important role and functions as "conditions" which must be satisfied in the course of executing the terms of the core contract.

In order to automate and coordinate the sequencing of pre-shipment contractual requirements, embodiments of the invention involve a post-transaction processing mechanism. The described embodiment coordinates, integrates and sequences the consolidation, generation and respective submission of a purchase order by the buyer to the seller, and the issue of an invoice from the seller to the buyer.

Under the rules of commercial trade (such as Incoterms 1990 and 2000 and the UCP 500), these conditions can also be arranged in a sequential fashion. If these conditions are automated within a process the proceeds in a stepwise fashion, the entire post-transaction execution process can be logically and systematically managed over time.

Unlike the transaction negotiation that can occur instantaneously, a time element is introduced into the post-transaction management functions. Each of the conditions can be configured such that, in a stepwise fashion, the proper satisfaction of each condition over time ensures that the core contract conditions are recognized as having been systematically satisfied by the system.

A post-transaction management system assists the user to monitor the progress of the functions as they are entered or activated within the system.

The post-negotiation process incorporates coordination functions that are governed by:
- the estimated time of departure (shipment of the product from the contracted port or point of loading/shipment)

logistical aspects of the transaction must be coordinated with the execution of agreed financing terms based on Incoterms 2000 and/or UCP 500.

The relationship between the logistics and shipping (by any relevant mode of transport) and the connectivity with the payment of that shipping function is the "trade trigger". The trade trigger is of critical importance to both the seller and buyer, as it determines the point in time within the contracted transaction process in which title to the goods (and thus risk exposure) passes from one party to another.

Depending on the terms of the core contract negotiated between the parties, the fundamental conditions which may require to be satisfied may include:

credit and finance
transport
insurance
inspection

Figure 9A:
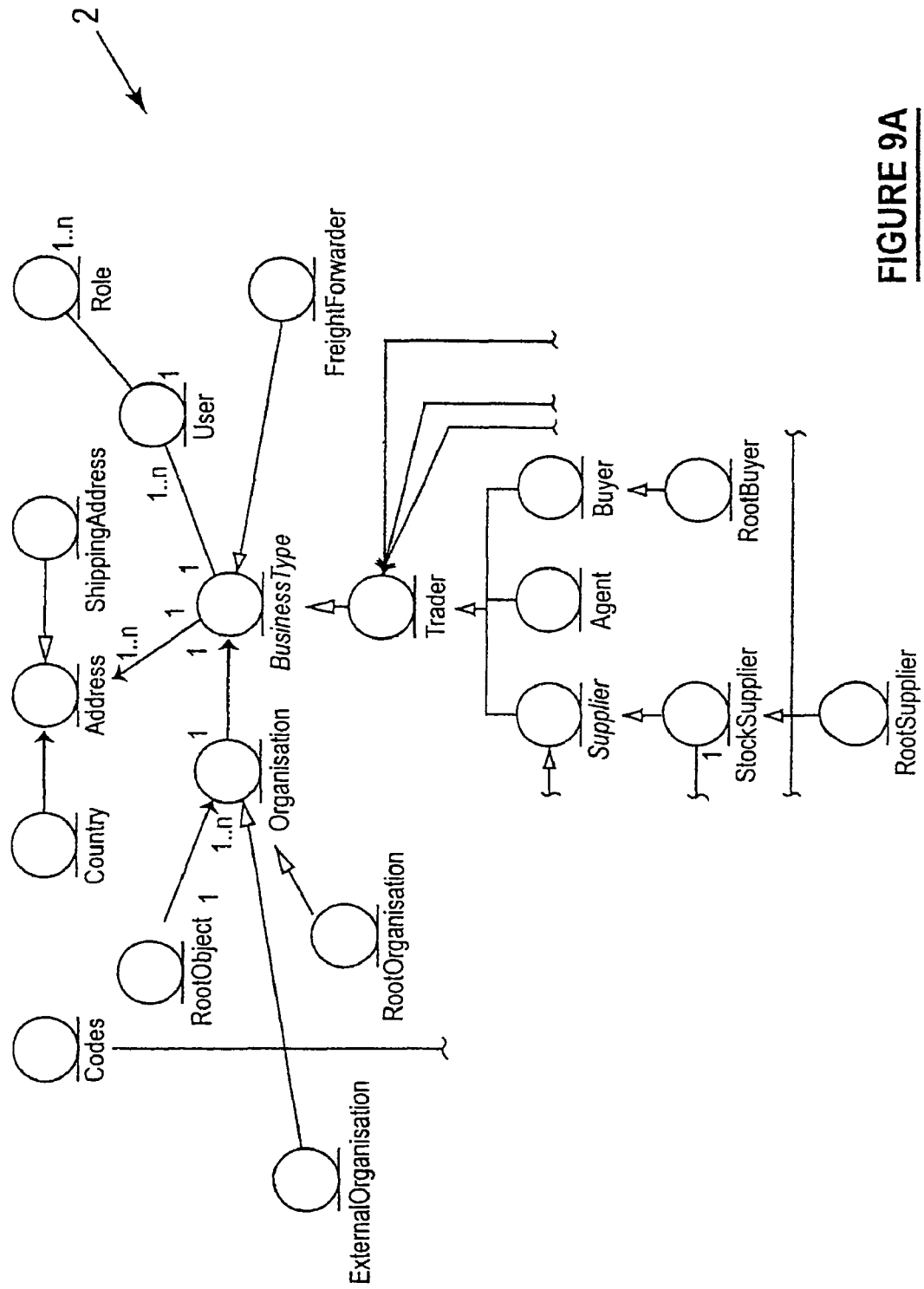
FIG. 9 is a schematic diagram representing the relationship between the procurement module and the sales module in respect of the purchase/sales order processing functions.
Figure 9B:
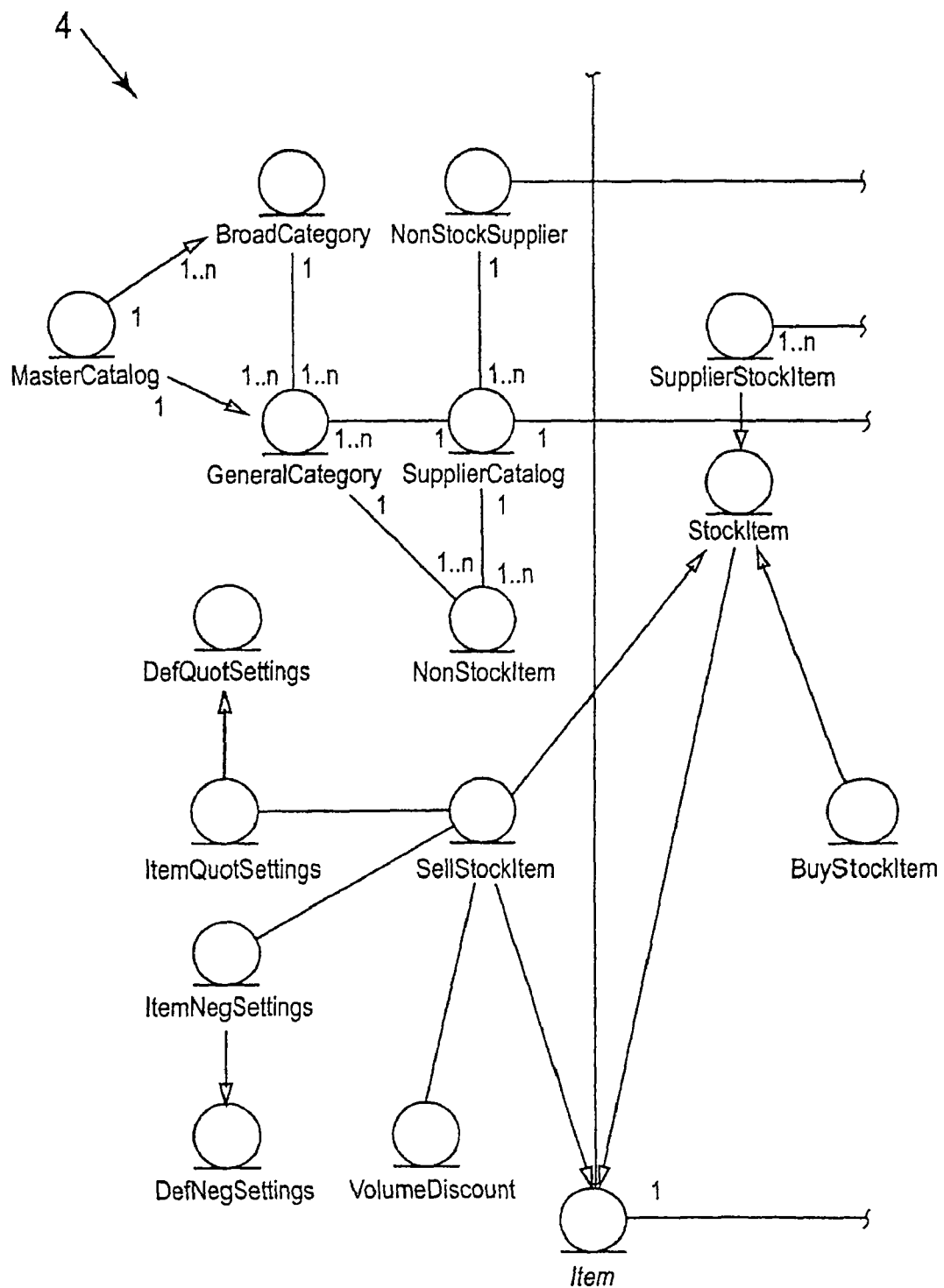
Figure 9C:
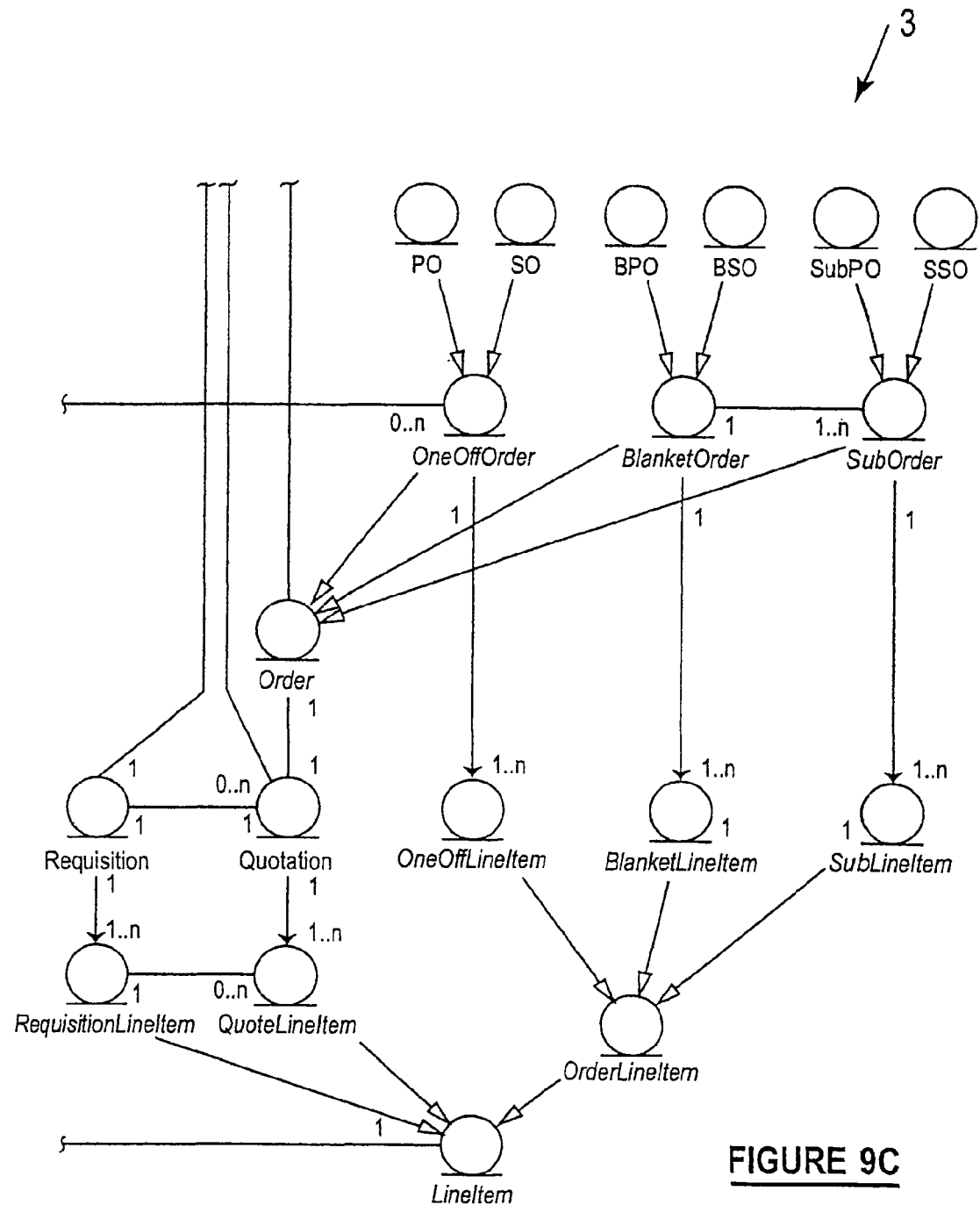

FIG. 9 is a schematic diagram representing the relationship between the procurement module 4 and the sales module 3 in respect of purchase/sales order processing functions. This figure illustrates the main categories of conditions which may require satisfaction before execution of the core contract can be seen as proceeding within the scope of the agreement.

Each of the oval figures in the diagram represents a sub-contract condition which must be satisfied in the post transaction phase of the process managed by the search module 2, sales module 3 and processing module 4 of the system 1. Each of these conditions, in turn, can be viewed as a "trigger". When appropriate data is interfaced into the process, a condition is satisfied which, in turn triggers the process to proceed to the next condition.

The final step in the transaction execution process links the sub-contract execution functions to a banking function. An important step in the process is the issuance of the official shipping document, the bill of lading or air weigh-bill. These documents are viewed in law as being documents of title which regulate the time at which risk of loss and passage of title to the property occur relative to the terms of the core contract.

Passage of these documents between the shipper, seller and buyer take on the added function of signalling the time at which the right of the seller to receive payment from the buyer occurs. The most important date is the date of issuance of the relevant shipping document.

The point in the business process at which the actual issuance time is entered into the system also represents that point at which the buyer becomes legally obligated to make payment to the seller (either now or at a future time). This importance of this event is that automated banking functions can now be activated.

Each of the oval figures in the diagram represents a sub-contract condition which must be satisfied in the post transaction phase of the process. Each of these conditions, in turn, can be viewed as a 'trigger'. When appropriate data is interfaced into the process, a condition is satisfied which, in turn triggers the process to proceed to the next condition.

Data interfacing and integration is a central function of the post-negotiation aspect of the described embodiment. The system 1 has been designed to reflect a logic that is influenced by two underlying principles:

simple logic structures in order to permit easy data manipulation and technical programming; while at the same time,
maximizing process efficiency and accuracy.

The system functions by:
coordinating and combining data from internal and external sources
processing data combinations and generating new data
consolidating simple data with generated outcomes
sequencing the data manipulation and coordination functions according to time and other conditional factors The system 1 performs the data interfacing and integration functions described above by means of a central coordinating device that controls data interface and data distribution timing and sequencing. This device, in effect, controls the logic that drives the system's internal functions as well as external systems and users. Although the overall system 1 performs a number of discrete operations, these operations are prompted or controlled by the central coordinating mechanism which is, in turn, tied to data interfacing.

In order for the overall system 1 to function properly, it should ideally perform systematic data retrieval and storage functions. These functions are made more complex given the differing sources of data. The data used includes:

simple data which is not manipulated or transformed, but is necessary to the transaction
system generated data (originating from simple data that is transformed)

This data is entered from several system interfaces (or sources). The data input via all interface sources is either stored in database form (and is used at some future time) or is used in an immediate processing function.

The sources of data are:
real-time data originating from user interfaces
system generated data originating from a processing/computation function
data originating from interface with intranet systems
external data originating from interfacing with other Internet sources Given the various sources of data and the differing time requirements for its use, the system performs and coordinates numerous data prompting, retrieval and allocation functions. This provides a foundation for the more complex integration functions which are described below.

Whereas data sourcing and distribution is one integration-related function, the system performs integration functions that proceed at a higher level of complexity. At this level, an underlying systems logic is used to combine technical simplicity in the data configuration processes (described above) with process efficiency considerations. It is at this level of the integration process where business transaction logic is combined with the invention's data logic.

Enterprise resource planning (ERP) systems are computer and database management systems. ERP systems assist business organizations by improving internal process efficiency by linking databases that contain an organizations supply chain related activities what the organization's manufacturing planning, finance and administration functions.

ERP systems do not allow for integration of information relating to external business transactions.

The described embodiment of the system 1 includes an interface mechanism that allows for the coordination of information between "back-end" computing systems and "front-end" marketing and transactional activities.

The interface component uploads relevant data from the host systems:
product item master database
customer master database
manufacturing and planning master database This uploaded data is consolidated and distributed to the appropriate Internet modules; that is, product inventory/display modules, transaction hub module.

Further, the described embodiment of the system 1 consolidates and distributes data and information generated from Internet functions including other support services.

In a business transactional sense, concluding a business transaction can be viewed as a sequential process of satisfying a series of inter-related, but necessary conditions. In a mechanical sense, the process of achieving or satisfying the conditionality requirements requires a stepwise and simultaneous:

generation of new data by the system's internal functions; or the selection and re-configuration of existing data;

which is then entered into the system in an appropriate and logical time sequence to satisfy the necessary contractual pre-conditions.

Although stated in simplistic terms above, this function requires the integration of data from multiple data sources, a transformation of some of that data as well as a re-ordering of re-configured untransformed data with newly generated data outcomes.

A third level of systems logic is now described. The two stages described above involve data inputting and processing. The results of these processes create a new series of values representing variables influencing new equilibrium conditions in the post transaction stages of the process.

The new equilibrium conditions are reflected as data outputs which must be properly allocated:

internally of the system externally of the system but internally within a firm's intranet systems externally to other Internet systems The timing and sequencing of the data output distribution and allocation process is, in turn, influenced by functions described as part of data interfacing, processing and integration which simultaneously occur, or have already occurred.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. At least one non-transitory computer-readable storage medium storing a computer-executable e-commerce transaction facilitation program, the program comprising:

a sales routine;

a procurement routine; and instructions for transferring a quotation from the sales routine to the procurement routine;

instructions for transferring a reverse tender/quotation from the procurement routine to the sales routine;

instructions for permitting modification of the quotation and the reverse tender/quotation based on negotiation of terms of a sale;

instructions for transferring a purchase order from the procurement routine to the sales routine;

instructions for tracking sales orders;

instructions for tracking purchase orders;

instructions for operatively connecting the sales routine with a seller via the Internet;

instructions for operatively connecting the procurement routine to a buyer via the Internet;

instructions allowing the sales routine and the procurement routine to be executed by a user connected to one of the sales routine and the procurement routine via the Internet, wherein:

the sales routine includes instructions for determining a desirability value of at least one trading profile representing a reverse tender quotation communicated to the sales routine from the procurement routine;

the procurement routine includes instructions for determining a desirability value of at least one trading profile representing a quotation communicated to the procurement routine from the sales routine; and the sales routine or the procurement routine further includes instructions for indicating the trading profile with a highest desirability value.

2. A non-transitory computer-readable storage medium according to claim 1, wherein the sales routine includes instructions for maintaining confidential at least some information accepted from the seller.

3. A non-transitory computer-readable storage medium according to claim 1, wherein the procurement routine includes instructions for maintaining confidential at least some information accepted from the buyer.

4. A non-transitory computer-readable storage medium according to claim 1, further including instructions for conducting an auction.

5. A non-transitory computer-readable storage medium according to claim 1, further comprising:

instructions for controlling a search/directory routine; wherein:

the sales routine includes instructions for a catalogue/search routine that can communicate a search query to the search/directory routine to perform a search of product catalogue and a search result is returned and the search/directory routine communicates the search result to the sales routine.

6. A non-transitory computer-readable storage medium according to claim 1, wherein at least one of the sales routine and the procurement routine include a registration routine for communicating information between the sales routine or the procurement routine and an enterprise recourse planning system.

7. A non-transitory computer-readable storage medium according to claim 1, wherein the sales routine and procurement routine reside on a seller's computer system and at least one buyer can connect with an utilize the sales routine via a web browser.

8. A non-transitory computer-readable storage medium according to claim 1, wherein the sales routine and procurement routine reside on a buyer's computer system and at least one seller can connect with an utilize the sales routine via a web browser.

9. A non-transitory computer-readable storage medium according to claim 1, wherein the sales routine and procurement routine reside on a buyer's computer system and a plurality of different sellers can connect with an utilize the sales routine via a web browser.

10. A non-transitory computer-readable storage medium according to claim 1, wherein the sales routine and procurement routine reside on a seller's computer system and a plurality of different buyers can connect with an utilize the sales routine via a web browser.

11. A non-transitory computer-readable storage medium according to claim 1, wherein the procurement routine is capable of both direct stock procurement and indirect stock procurement.

12. A non-transitory computer-readable storage medium according to claim 1, wherein the sales routine includes instructions for limiting distribution of information obtained by the sales routine to only those recipients for which the information is intended.

* * * * *